US 6,751,789 B1

(12) United States Patent
Berry et al.

(10) Patent No.: US 6,751,789 B1
(45) Date of Patent: Jun. 15, 2004

(54) METHOD AND SYSTEM FOR PERIODIC TRACE SAMPLING FOR REAL-TIME GENERATION OF SEGMENTS OF CALL STACK TREES AUGMENTED WITH CALL STACK POSITION DETERMINATION

(75) Inventors: Robert Francis Berry, Austin, TX (US); Frank Eliot Levine, Austin, TX (US); Robert J. Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/418,378

(22) Filed: Oct. 14, 1999

Related U.S. Application Data

(63) Continuation-in-part of application No. 09/343,439, filed on Jun. 30, 1999, now Pat. No. 6,553,564, and a continuation-in-part of application No. 09/343,438, filed on Jun. 30, 1999, now Pat. No. 6,513,155, and a continuation-in-part of application No. 09/177,031, filed on Oct. 22, 1998, now Pat. No. 6,311,325, and a continuation-in-part of application No. 09/052,329, filed on Mar. 31, 1998, now Pat. No. 6,002,872, and a continuation-in-part of application No. 08/989,725, filed on Dec. 12, 1997, now Pat. No. 6,055,492.

(51) Int. Cl.[7] .................................................. G06F 9/44
(52) U.S. Cl. ......................... 717/130; 717/131; 714/35
(58) Field of Search ................................ 717/127–161, 717/45; 714/45, 35

(56) References Cited

U.S. PATENT DOCUMENTS

| 4,520,441 A | 5/1985 | Bandoh et al. | 364/200 |
|---|---|---|---|
| 4,558,413 A | 12/1985 | Schmidt et al. | 364/300 |
| 4,703,417 A | 10/1987 | Morganti et al. | 364/200 |
| 4,841,439 A | 6/1989 | Nishikawa et al. | 364/200 |
| 4,866,599 A | 9/1989 | Morganti et al. | 364/200 |

(List continued on next page.)

FOREIGN PATENT DOCUMENTS

| JP | 02191017 | 10/1990 | ............ G06F/3/03 |
|---|---|---|---|
| JP | 04131921 | 8/1992 | ............ G06F/3/02 |
| JP | 10083326 | 3/1998 | ........... G06F/11/28 |

OTHER PUBLICATIONS

Method for Correlating Graphical Data On An Interactive Display; International Business Machines Corporation; IBM Technical Disclosure Bulletin; vol. 21, No. 11, Apr. 1979; pp. 4658–4659.

(List continued on next page.)

Primary Examiner—Tuan Dam
Assistant Examiner—Chuck Kendall
(74) Attorney, Agent, or Firm—Duke W. Yee; Leslie A. Van Leeuwen

(57) ABSTRACT

A method and system for profiling a program using periodic trace sampling is provided. During the execution of the program, sample-based profiling of the executing program is performed—for a predetermined period, a profiler performs trace processing for the program, after which the profiler pauses and does not perform trace processing for a predetermined period or only performs lightweight processing for a predetermined period. The periods controlling the profiler may be selected by a user, and the periods may be measured by temporal or non-temporal metrics. The user may also specify parameters that are used to filter events so that profiling is performed only for specified threads or methods. The profiler cycles through these periods, during which selected events are processed to generate a profile of the execution flows within the program. For each sample period, a tree data structure is generated in which nodes of the tree data structure represent the routines of the program that execute during the sample period, as may be indicated by entry and exit events caused by the execution of the routines. At the start of each sample period, execution flow information may be used to create an initial tree data structure. When the execution of the program is complete, the tree data structures from each sample period are merged into a resulting tree data structure.

30 Claims, 21 Drawing Sheets

U.S. PATENT DOCUMENTS

| | | | |
|---|---|---|---|
| 4,868,738 A | 9/1989 | Kish et al. | 364/200 |
| 5,003,458 A | 3/1991 | Yamaguchi et al. | 364/200 |
| 5,047,919 A | 9/1991 | Sterling et al. | 364/200 |
| 5,295,230 A | 3/1994 | Kung | 395/75 |
| 5,321,834 A | 6/1994 | Weiser et al. | 395/600 |
| 5,355,487 A | 10/1994 | Keller et al. | 395/650 |
| 5,465,258 A | 11/1995 | Adams | 395/700 |
| 5,481,712 A | 1/1996 | Silver et al. | 395/700 |
| 5,485,616 A | 1/1996 | Burke et al. | 395/700 |
| 5,493,689 A | 2/1996 | Waclawsky et al. | 395/821 |
| 5,506,955 A | 4/1996 | Chen et al. | 395/183.02 |
| 5,539,907 A | 7/1996 | Srivastava et al. | 395/700 |
| 5,553,235 A | 9/1996 | Chen et al. | 395/182.18 |
| 5,611,061 A | 3/1997 | Yasuda | 395/591 |
| 5,613,118 A | 3/1997 | Heisch et al. | 395/709 |
| 5,649,085 A | 7/1997 | Lehr | 395/140 |
| 5,689,712 A | 11/1997 | Heisch | 395/704 |
| 5,732,273 A | 3/1998 | Srivastava et al. | 395/704 |
| 5,737,609 A | 4/1998 | Reed et al. | 395/704 |
| 5,748,878 A | 5/1998 | Rees et al. | 395/183.14 |
| 5,764,944 A | 6/1998 | Hwang et al. | 395/417 |
| 5,768,500 A | 6/1998 | Agrawal et al. | 395/184.01 |
| 5,784,554 A * | 7/1998 | Hsiung | 714/45 |
| 5,828,883 A * | 10/1998 | Hall | 717/133 |
| 5,940,871 A | 8/1999 | Goyal et al. | 711/206 |
| 5,948,112 A | 9/1999 | Shimada et al. | 714/16 |
| 5,950,003 A * | 9/1999 | Kaneshiro et al. | 717/130 |
| 6,002,872 A * | 12/1999 | Alexander, III et al. | 717/127 |
| 6,070,009 A * | 5/2000 | Dean et al. | 717/130 |

OTHER PUBLICATIONS

Abstract Models of Memory Management; Morrisett et al.; International Conference On Functional Programming Languages and Computer Architecture; 1995; pp. 66–77.

Presentation Tools For Performance Visualization: The M31 Instrumentation Experience; Reilly, M.; pp. 307–313; Hawaii International Conference On System Sciences, $23^{rd}$, Kailua–Kona, HI Jan. 2–5, 1990.

Model Based Reasoning in Diagnostic Expert Systems For Chemical Process Plants, Rich, et al.; Computers and Chemical Engineering; vol. 11. Issue 2, 1987, pp. 111–122.

Cluster Objects For Mass Editing; International Business Machines Corporation; Research Disclosure Jul. 1989.

Electron Bean Fabrication of Prepregs; International Business Machines Corporation; Research Disclosure, May 1988.

Data Structure and Insertion Algorithm for Representing Asynchronous Occurrences for Visualization by Trace Visualization Tools Using Ghant Charts with Occurrence Hierarchies; International Business Machines Corporation; IBM Technical Disclosure Bulletin; vol. 36, No. 07, Jul. 1993, pp. 547–557.

Adaptive Trace–Directed Program Restructuring; International Business Machines Corporation; IBM Technical Disclosure Bulletin; vol. 37, No. 02B, Feb. 1994; pp. 115–116.

Profiling and Tracing Dynamic Library Usage Via Interposition; Curry, TW; Proceedings of the summer 1994 USENIX Conference; pp. 267–278.

Application of Interpreter for Debugging Functions; International Business Machines Corporation; IBM Technical Disclosure Bulletin; vol. 36, No. 09B, Sep. 1993; pp. 67–68.

Implementation of High Performance Subtype Object Migration; International Business Machines Corporation; IBM Technical Disclosure Bulletin; vol. 38, No. 11, Nov. 1995; pp. 311–314.

* cited by examiner

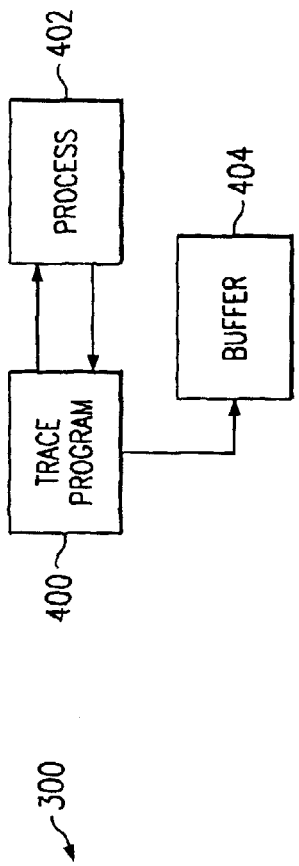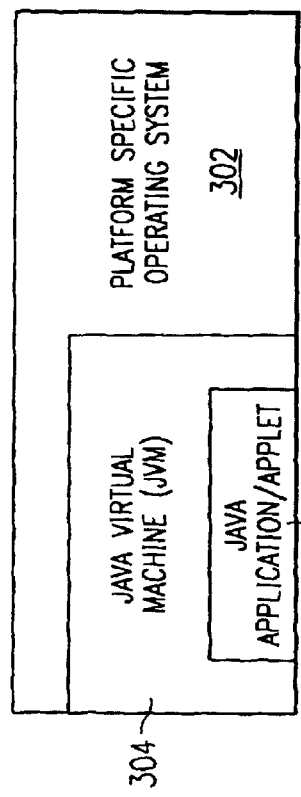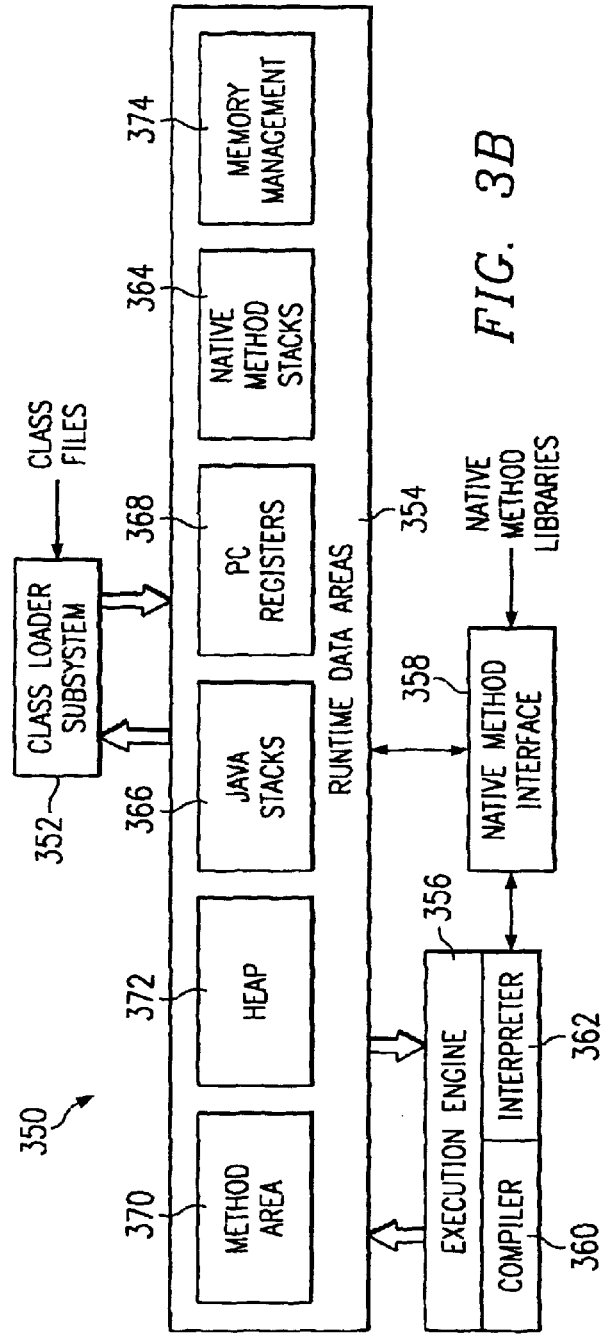

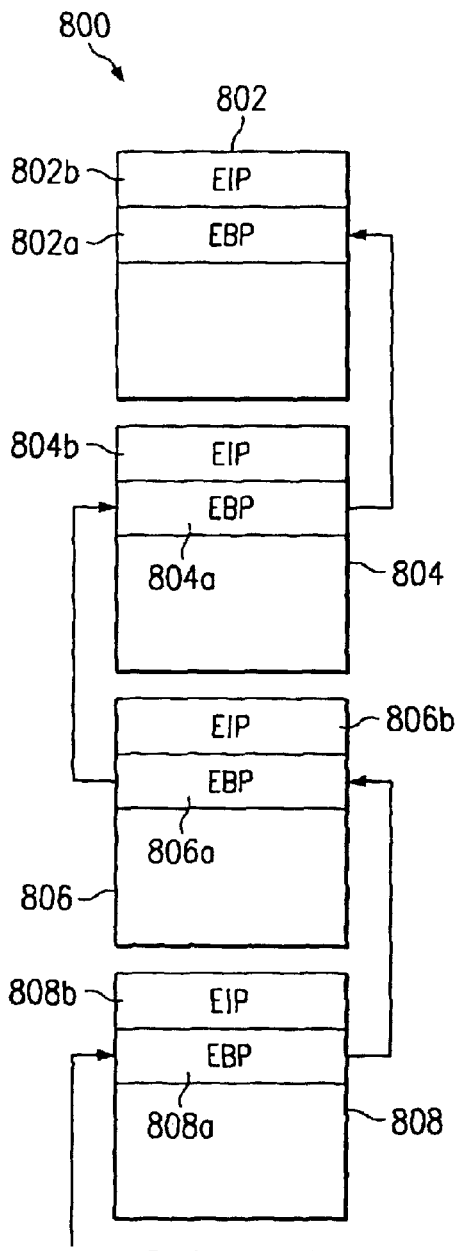
| TIMESTAMP | EVENT | CALL STACK AFTER EVENT |
|---|---|---|
| 0 | ENTER C | C |
| 1 | ENTER A | CA |
| 2 | ENTER B | CAB |
| 3 | EXIT FROM B | CA |
| 4 | ENTER B | CAB |
| 5 | ENTER B | CABB |
| 6 | EXIT FROM B | CAB |
| 7 | EXIT FROM B | CA |
| 8 | EXIT FROM A | C |
| 9 | ENTER B | CB |
| 10 | ENTER A | CBA |
| 11 | ENTER B | CBAB |
| 12 | ENTER A | CBABA |
| 13 | EXIT FROM A | CBAB |
| 14 | EXIT FROM B | CBA |
| 15 | ENTER X | CBAX |
| 16 | EXIT FROM X | CBA |
| 17 | EXIT FROM A | CB |
| 18 | EXIT FROM B | C |
| 19 | EXIT FROM C | |
FIG. 8
FIG. 10A
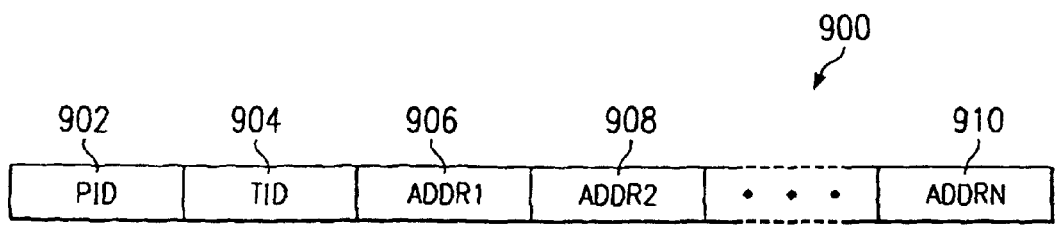
FIG. 9

| SAMPLE | CALL STACK AT SAMPLE |
|---|---|
| 1 | C |
| 2 | CAB |
| 3 | CAB |
| 4 | CAB |
| 5 | C |
| 6 | CBA |
| 7 | CBABA |
| 8 | CBA |
| 9 | CBA |
| 10 | C |
FIG. 10B
| CALLS | BASE | CUM | NAME |
|---|---|---|---|
| 1 | 0 | 19 | pt_pit.tid |
| 1 | 3 | 19 | C |
| 3 | 7 | 14 | A |
| 5 | 8 | 13 | B |
| 1 | 1 | 1 | X |
1502  1504  1506  1508
1500
FIG. 15
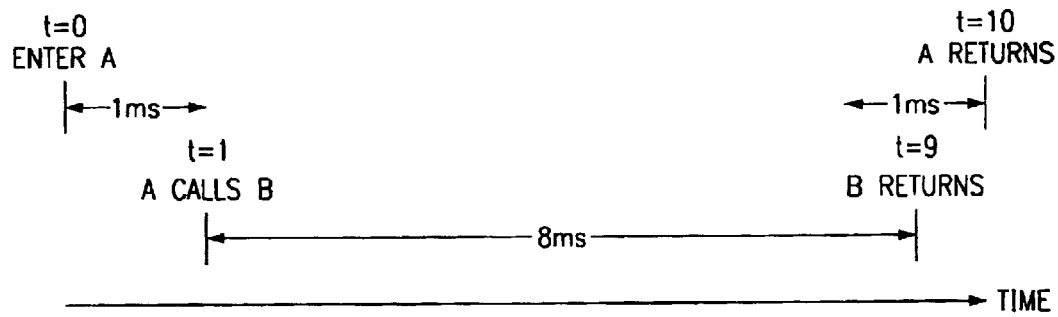
FIG. 10C
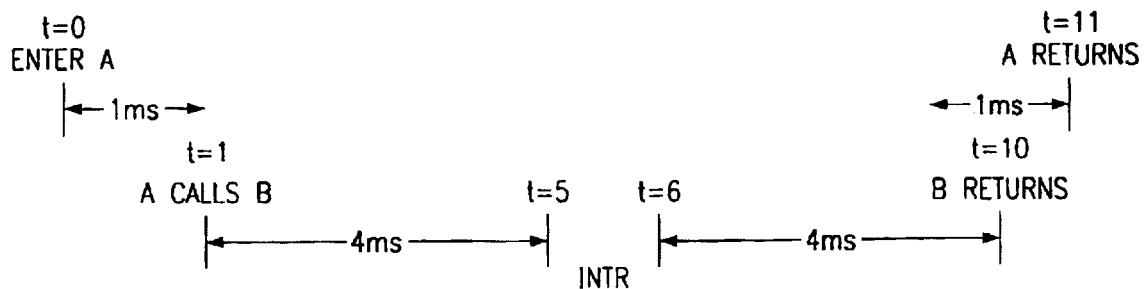
FIG. 10D

| LEVEL | RL | CALLS | BASE | CUM | INDENT |
|---|---|---|---|---|---|
| 0 | 1 | 1 | 0 | 19 | pt_pidtid |
| 1 | 1 | 1 | 3 | 19 | -C |
| 2 | 1 | 1 | 3 | 7 | --A |
| 3 | 1 | 2 | 3 | 4 | ---B |
| 4 | 2 | 1 | 1 | 1 | ----B |
| 2 | 1 | 1 | 2 | 9 | --B |
| 3 | 1 | 1 | 3 | 7 | ---A |
| 4 | 2 | 1 | 2 | 3 | ----B |
| 5 | 2 | 1 | 1 | 1 | -----A |
| 4 | 1 | 1 | 1 | 1 | ----X |

1600 

ArcFlow OUTPUT
  BASE — TIME/INSTRUCTIONS DIRECTLY IN FUNCTION
  CUM — TIME/INSTRUCTIONS DIRECTLY AND INDIRECTLY IN FUNCTION ArcFlow INVARIENTS:
1) Sum(Parent(Calls)) = Self(Calls)
2) Sum(Parent(Base)) = Self(Base)
3) Sum(Parent(Cum)) = Self(Cum)
4) Sum(Child(Cum)) = Self(Cum) − Self(Base)

| SOURCE | CALLS | BASE | CUM | FUNCTION |
|---|---|---|---|---|
| SELF | 1 | 0 | 19 | [0] pt_pidtid |
| CHILD | 1 | 3 | 19 | C |
| PARENT | 1 | 3 | 19 | pt_pidtid |
| SELF | 1 | 3 | 19 | [1] C |
| CHILD | 1 | 2 | 9 | B |
| CHILD | 1 | 3 | 7 | A |
| PARENT | 1 | 3 | 7 | C |
| PARENT | 1 | 3 | 7 | B |
| rPARENT | 1 | 1 | 1 | B |
| SELF | 3 | 7 | 14 15 | [2] A |
| CHILD | 3 | 5 | 7 | B |
| CHILD | 1 | 1 | 1 | X |
| PARENT | 2 | 3 | 4 | A |
| rPARENT | 1 | 2 | 3 | A |
| PARENT | 1 | 2 | 9 | C |
| SELF | 5 | 8 | 13 17 | [3] B |
| CHILD | 1 | 3 | 7 | A |
| rCHILD | 1 | 1 | 1 | A |
| CHILD | 1 | 1 | 1 | B |
| PARENT | 1 | 1 | 1 | A |
| SELF | 1 | 1 | 1 | [4] X |

```
UNITS : : TICKS
TOTAL : : 342

LvL  RL  CALLS   BASE   CUM   INDENT NAME
1    1   1       0      342   - _Thread-21__(0xe0046618)
2    1   3       0      342   -- J:nullTestScore () |
3    1   2       0      272   --- J:nullTestMilliseconds (I) |
4    1   29450   0      271   ---- J:nullexecute () |
5    1   271     0      271   ----+ stack_0x40 ~1702
6    1   271     0      271   ----+- F:ExecuteJava
7    1   271     0      271   ----+-- F:jit_invokeCompiledEntryMethod
8    1   271     0      271   ----+--- F:_jit_invokeentry
9    1   271     0      271   ----+---- F:_JITInvokeCompiledEntryMethod_md
10   1   271     0      271   ----+----+ J:nullrun () V
11   2   271     0      271   ----+----+ J:nullTestScore () |
12   2   271     0      271   ----+----+- J:nullTestMilliseconds (I) |    ⎱
13   2   271     268    271   ----+----+-- J:nullexecute () |              ⎰ 1706
14   1   2       0      2     ----+----+--- F:jperf_methodEntry
15   1   2       0      2     ----+----+--- + F:SoftTracehook
16   1   2       2      2     ----+----+--- +- F:enable_interrupts
14   1   1       1      1     ----+----+--- F:jperf_methodExit
4    1   1       0      1     ----+ stack_0x40 ~1704
5    1   1       0      1     ----+- F:ExecuteJava
6    1   1       0      1     ----+-- F:jit_invokeCompiledEntryMethod
7    1   1       0      1     ----+--- F:_jit_invokeentry
8    1   1       0      1     ----+---- F:_JITInvokeCompiledEntryMethod_md
9    1   1       0      1     ----+----+ J:nullrun () V
10   1   1       0      1     ----+----+ J:nullTestScore () |
11   1   1       0      1     ----+----+- J:nullTestMilliseconds (I) |    ⎱
12   1   1       0      1     ----+----+-- J:nullexecute () |              ⎰ 1708
13   1   1       0      1     ----+----+--- F:jperf_methodEntry
14   1   1       0      1     ----+----+--- F:SoftTracehook
15   1   1       1      1     ----+----+--- F:jperf_methodExit
                                              + F:enable_interrupts
4    1   2       0      0     ---- J:nullcleanUp () |
```

1700

| MAJOR CODE | MINOR CODE | DATA ITEM 1 | DATA ITEM 2 | DATA ITEM 3 | DATA ITEM 4 | DATA ITEM 5 | DESCRIPTION |
|---|---|---|---|---|---|---|---|
| 0x4 | LEVEL + 0x1 | DEPTH | N/A | N/A | N/A | | BEGIN INTERRUPT AT LEVEL |
| 0x4 | LEVEL + 0x80000001 | DEPTH | N/A | N/A | N/A | | END INTERRUPT AT LEVEL |
| 0x10 | 0xab | SYSTEM TID | JAVA TID | IS SYSTEM THREAD (BOOLEAN) | N/A | | THREAD CREATED WITHOUT A NAME WHILE TRACE ACTIVE |
| 0x10 | 0xac | SYSTEM TID | N/A | N/A | N/A | | IDENTIFIES THE IDLE THREAD |
| 0x10 | 0xad | SYSTEM TID | N/A | N/A | N/A | | IDENTIFIES THE GARBAGE COLLECTION THREAD |
| 0x10 | 0xae | SYSTEM TID | JAVA TID | THREAD NAME | N/A | | THREAD CREATED WITH A NAME WHILE TRACE ACTIVE |
| 0x30 | 0x10 | OBJECT ID | METHOD BLOCK ADDRESS | N/A | N/A | | METHOD INVOCATION (INTERPRETED) |

| | | | | | | |
|---|---|---|---|---|---|---|
| 0x30 | 0x10 + 0x80000000 | OBJECT ID | METHOD BLOCK ADDRESS | N/A | N/A | METHOD EXIT (INTERPRETED) |
| 0x40 | 0x7fffffff | NUMBER (n) OF STACK UNWINDS AT TIMER INTERRUPT | pc1-PROGRAM COUNTER OF INTERRUPTED ROUTINE | pc2-CALLER OF INTERRUPTED ROUTINE | ...... | pcn-1 OF n-2nd CALLER OF INTERRUPTED ROUTINE | pcn OF n-1st CALLER OF INTERRUPTED ROUTINE |
| 0x41 | 0x7fffffff | NUMBER (n) OF STACK UNWINDS AT INSTRUMENTED ROUTINE | pc1-PROGRAM COUNTER OF INSTRUMENTED ROUTINE | pc2-CALLER OF INSTRUMENTED ROUTINE | ...... | | pcn OF n-1st CALLER OF INSTRUMENTED ROUTINE |
| 0x50 | 0x10 | OBJECT ID | METHOD BLOCK ADDRESS | N/A | N/A | N/A | METHOD INVOCATION (jitted) |
| 0x50 | 0x10 + 0x80000000 | OBJECT ID | METHOD BLOCK ADDRESS | N/A | N/A | N/A | METHOD EXIT (jitted) |

FROM FIG. 18B

FIG. 18B

METHOD AND SYSTEM FOR PERIODIC TRACE SAMPLING FOR REAL-TIME GENERATION OF SEGMENTS OF CALL STACK TREES AUGMENTED WITH CALL STACK POSITION DETERMINATION

CROSS-REFERENCE TO RELATED APPLICATIONS

This application is a continuation-in-part of the following copending and commonly assigned applications entitled "SYSTEM AND METHOD FOR PROVIDING TRACE INFORMATION REDUCTION", U.S. application Ser. No. 08/989,725, filed on Dec. 12, 1997, Now U.S. Pat. No. 6,055,492, "A METHOD AND APPARATUS FOR STRUCTURED PROFILING OF DATA PROCESSING SYSTEMS AND APPLICATIONS", U.S. application Ser. No. 09/052,329, Now U.S. Pat. No. 6,002,872, filed on Mar. 31, 1998; "METHOD AND APPARATUS FOR PROFILING PROCESSES IN A DATA PROCESSING SYSTEM", U.S. application Ser. No. 09/177,031, Now U.S. Pat. No. 6,311,325, filed on Oct. 22, 1998; "PROCESS AND SYSTEM FOR MERGING TRACE DATA FOR PRIMARILY INTERPRETED METHODS". U.S. application Ser. No. 09/343,439, Now U.S. Pat. No. 6,553,564, filed on Jun. 30, 1999; and "METHOD AND SYSTEM FOR MERGING EVENT-BASED DATA AND SAMPLED DATA INTO POSTPROCESSED TRACE OUTPUT", U.S. application Ser. No. 09/343,438, Now U.S. Pat. No. 6,513,155, filed on Jun. 30, 1999.

The present invention is related to the following applications entitled "METHOD AND SYSTEM FOR DETECTING AND RECOVERING FROM ERRORS IN TRACE DATA", U.S. application Ser. No. 09/393,083, Now U.S. Pat. No. 6,604,210, filed Sep. 9, 1999, "METHOD AND SYSTEM FOR PERIODIC TRACE SAMPLING FOR REAL-TIME GENERATION OF SEGMENTS OF CALL STACK TREES", U.S. application Ser. No. 09/418,379, filed Oct. 14, 1999, currently pending; all of which are assigned to the same assignee. The present application is also related to U.S. application Ser. No. 09/052,331, now U.S. Pat. No. 6,158,024, which is hereby incorporated by reference.

BACKGROUND OF THE INVENTION

1. Technical Field

The present invention relates to an improved data processing system and, in particular, to a method and apparatus for optimizing performance in a data processing system. Still more particularly, the present invention provides a method and apparatus for a software program development tool for enhancing performance of a software program through software profiling.

2. Description of Related Art

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most I/O requests. Hardware performance tools may be built into the system or added at a later point in time. Software performance tools also are useful in data processing systems, such as personal computer systems, which typically do not contain many, if any, built-in hardware performance tools.

One known software performance tool is a trace tool. A trace tool may use more than one technique to provide trace information that indicates execution flows for an executing program. One technique keeps track of particular sequences of instructions by logging certain events as they occur, so-called event-based profiling technique. For example, a trace tool may log every entry into, and every exit from, a module, subroutine, method, function, or system component. Alternately, a trace tool may log the requester and the amounts of memory allocated for each memory allocation request. Typically, a time-stamped record is produced for each such event. Corresponding pairs of records similar to entry-exit records also are used to trace execution of arbitrary code segments, starting and completing I/O or data transmission, and for many other events of interest.

In order to improve performance of code generated by various families of computers, it is often necessary to determine where time is being spent by the processor in executing code, such efforts being commonly known in the computer processing arts as locating "hot spots." Ideally, one would like to isolate such hot spots at the instruction and/or source line of code level in order to focus attention on areas which might benefit most from improvements to the code.

Another trace technique involves periodically sampling a program's execution flows to identify certain locations in the program in which the program appears to spend large amounts of time. This technique is based on the idea of periodically interrupting the application or data processing system execution at regular intervals, so-called sample-based profiling. At each interruption, information is recorded for a predetermined length of time or for a predetermined number of events of interest. For example, the program counter of the currently executing thread, which is a process that is part of the larger program being profiled, may be recorded during the intervals. These values may be resolved against a load map and symbol table information for the data processing system at post-processing time, and a profile of where the time is being spent may be obtained from this analysis.

For example, isolating such hot spots to the instruction level permits compiler writers to find significant areas of suboptimal code generation at which they may thus focus their efforts to improve code generation efficiency. Another potential use of instruction level detail is to provide guidance to the designer of future systems. Such designers employ profiling tools to find characteristic code sequences and/or single instructions that require optimization for the available software for a given type of hardware.

Continuous event-based profiling has limitations. For example, continuous event-based profiling is expensive in terms of performance (an event per entry and per exit), which can and often does perturb the resulting view of performance. Additionally, this technique is not always available because it requires the static or dynamic insertion of entry/exit events into the code. This insertion of events is sometimes not possible or is often difficult. For example, if source code is unavailable for the to-be-instrumented code, event-based profiling may not be feasible. However, it is possible to instrument an interpreter of the source code to obtain event-base profiling information without changing the source code.

On the other hand, sample-based profiling provides only a "flat view" of system performance but does provide the benefits of reduced cost and reduced dependence on hooking-capability. Further, sample-based techniques do not identify where the time is spent in many small and seemingly unrelated functions or in situations in which no clear hot spot is apparent. Without an understanding of the program structure, it is not clear with a "flat" profile how to determine where the performance improvements can be obtained.

Therefore, it would be advantageous to provide a system that combines the benefits of event-based profiling with the benefits of reduced system perturbation in sample-based profiling. It would be particularly advantageous to provide the ability to enable and disable profiling of selected portions of a data processing system and to combine the output from different profiling periods into a single merged presentation.

SUMMARY OF THE INVENTION

A method and system for profiling a program using periodic trace sampling is provided. During the execution of the program, sample-based profiling of the executing program is performed—for a predetermined period, a profiler performs trace processing for the program, after which the profiler pauses and does not perform trace processing for a predetermined period or only performs lightweight processing for a predetermined period. The periods controlling the profiler may be selected by a user, and the periods may be measured by temporal or non-temporal metrics. The user may also specify parameters that are used to filter events so that profiling is performed only for specified threads or methods. The profiler cycles through these periods, during which selected events are processed to generate a profile of the execution flows within the program. For each sample period, a tree data structure is generated in which nodes of the tree data structure represent the routines of the program that execute during the sample period, as may be indicated by entry and exit events caused by the execution of the routines. At the start of each sample period, execution flow information may be used to create an initial tree data structure. When the execution of the program is complete, the tree data structures from each sample period are merged into a resulting tree data structure.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3A is a block diagram depicting the relationship of software components operating within a computer system that may implement the present invention;

FIG. 3B is a block diagram depicting a Java virtual machine in accordance with a preferred embodiment of the present invention;

FIG. 4 is a block diagram depicting components used to profile processes in a data processing system;

FIG. 8 is a diagram depicting the call stack containing stack frames;

FIG. 9 is an illustration depicting a call stack sample;

FIG. 10A is a diagram depicting a program execution sequence along with the state of the call stack at each function entry/exit point;

FIG. 10B is a diagram depicting a particular timer based sampling of the execution flow depicted in Figure 10A;

FIGS. 10C–D are time charts providing an example of the types of time for which the profiling tool accounts;

FIG. 15 is a diagram depicting a record generated using the processes of present invention;

FIG. 16 is a diagram depicting another type of report that may be produced to show the calling structure between routines shown in FIG. 12;

FIG. 17 is a table depicting a report generated from a trace file containing both event-based profiling information (method entry/exits) and sample-based profiling information (stack unwinds);

FIGS. 18A–18B are tables depicting major codes and minor codes that may be employed to instrument modules for profiling;

DETAILED DESCRIPTION OF THE PREFERRED EMBODIMENT

Figure 1:
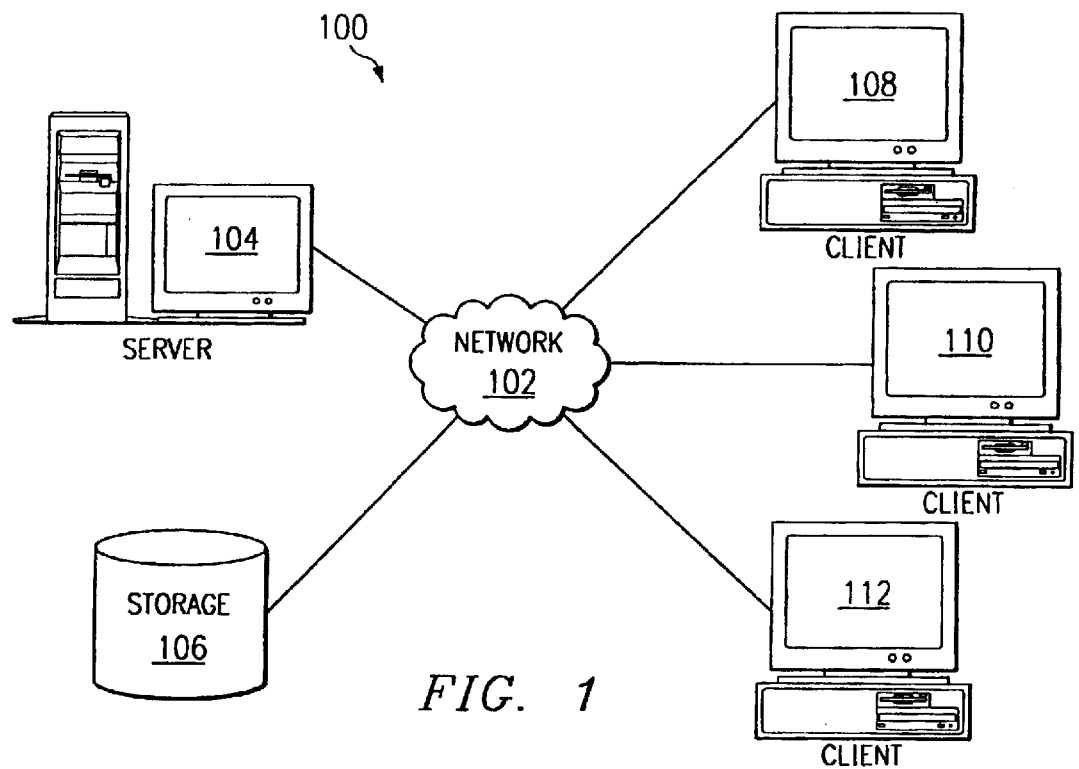
FIG. 1 depicts a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention.

Figure 2A:
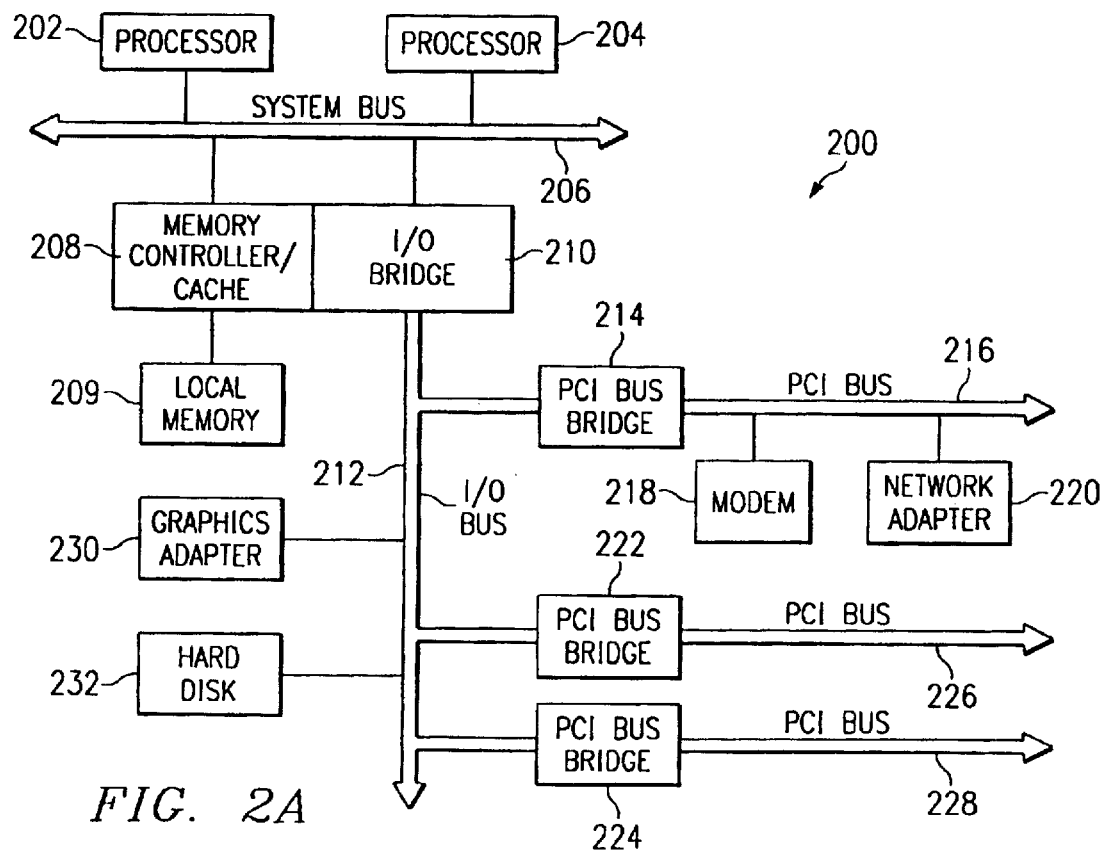
FIGS. 2A–B are block diagrams depicting a data processing system in which the present invention may be implemented.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
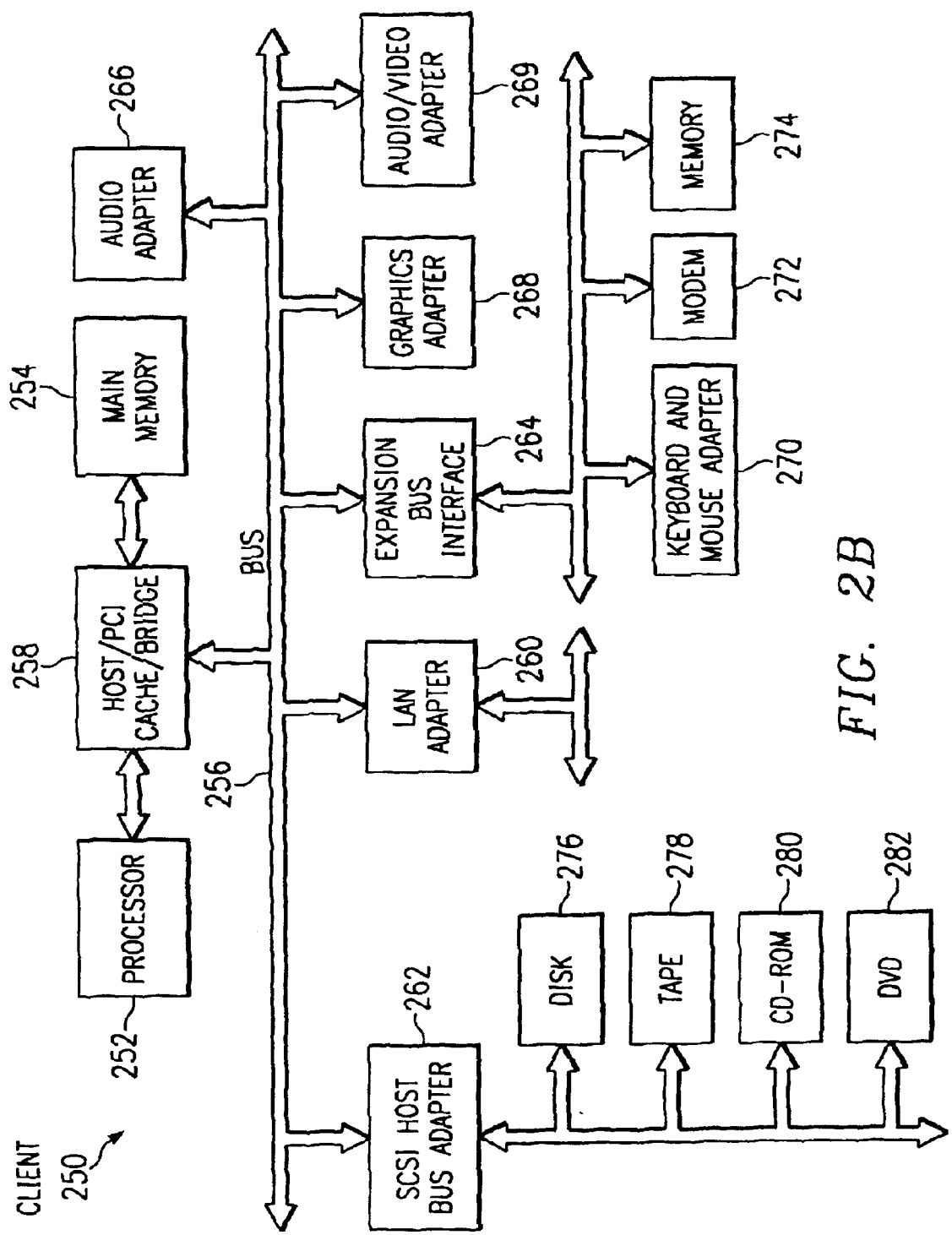

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as JavaOS For Business™ or OS/2™, which are available from International Business Machines Corporation™. JavaOS is loaded from a server on a network to a network client and supports Java programs and applets. A couple of characteristics of JavaOS that are favorable for performing traces with stack unwinds, as described below, are that JavaOS does not support paging or virtual memory. An object oriented programming system such as Java may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides a process and system for profiling software applications. Although the present invention may operate on a variety of computer platforms and operating systems, it may also operate within a Java runtime environment. Hence, the present invention may operate in conjunction with a Java virtual machine (JVM) yet within the boundaries of a JVM as defined by Java standard specifications. In order to provide a context for the present invention, portions of the operation of a JVM according to Java specifications are herein described.

With reference now to FIG. 3A, a block diagram illustrates the relationship of software components operating within a computer system that may implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded picoJava core.

At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Byte codes are may be translated into native code by a just-in-time compiler or JIT.

A JVM must load class files and execute the bytecodes within them. The JVM contains a class loader, which loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

Interpreting code provides an additional benefit. Rather than instrumenting the Java source code, the interpreter may be instrumented. Trace data may be generated via selected events and timers through the instrumented interpreter without modifying the source code. Profile instrumentation is discussed in more detail further below.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

With reference now to FIG. 3B, a block diagram of a JVM is depicted in accordance with a preferred embodiment of the present invention. JVM 350 includes a class loader subsystem 352, which is a mechanism for loading types, such as classes and interfaces, given fully qualified names. JVM 350 also contains runtime data areas 354, execution engine 356, native method interface 358, and memory management 374. Execution engine 356 is a mechanism for executing instructions contained in the methods of classes loaded by class loader subsystem 352. Execution engine 356 may be, for example, Java interpreter 362 or just-in-time compiler 360. Native method interface 358 allows access to resources in the underlying operating system. Native method interface 358 may be, for example, a Java native interface.

Runtime data areas 354 contain native method stacks 364, Java stacks 366, PC registers 368, method area 370, and heap 372. These different data areas represent the organization of memory needed by JVM 350 to execute a program.

Java stacks 366 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

PC registers 368 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 364 store the state of invocations of native methods. The state of native method invocations is stored in an implementation-dependent way in native method stacks, registers, or other implementation-dependent memory areas. In some JVM implementations, native method stacks 364 and Java stacks 366 are combined.

Method area 370 contains class data while heap 372 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 372. JVM 350 includes an instruction that allocates memory space within the memory for heap 372 but includes no instruction for freeing that space within the memory. Memory management 374 in the depicted example manages memory space within the memory allocated to heap 370. Memory management 374 may include a garbage collector which automatically reclaims memory used by objects that are no longer referenced. Additionally, a garbage collector also may move objects to reduce heap fragmentation.

The processes within the following figures provide an overall perspective of the many processes employed within the present invention: processes that generate event-based profiling information; processes that generate sample-based profiling information; processes that use the profile information to generate more useful information, such as representations of call stack trees, to be placed into profile reports; and processes that generate the profile reports for the user of the profiling utility.

With reference now to FIG. 4, a block diagram depicts components used to profile processes in a data processing system. A trace program 400 is used to profile processes 402. Trace program 400 may be used to record data upon the execution of a hook, which is a specialized piece of code at a specific location in a routine or program in which other routines may be connected. Trace hooks are typically inserted for the purpose of debugging, performance analysis, or enhancing functionality. These trace hooks are employed to send trace data to trace program 400, which stores the trace data in buffer 404. The trace data in buffer 404 may be subsequently stored in a file for post-processing, or the trace data may be processed in real-time.

With Java operating systems, the present invention employs trace hooks that aid in identifying methods that may be used in processes 402. In addition, since classes may be loaded and unloaded, these changes may also be identified using trace data. This is especially relevant with "network client" data processing systems, such as those that may operate under JavaOS, since classes and jitted methods may be loaded and unloaded more frequently due to the constrained memory and role as a network client. Note that class load and unload information is also relevant in embedded application environments, which tend to be memory constrained.

Figure 5:
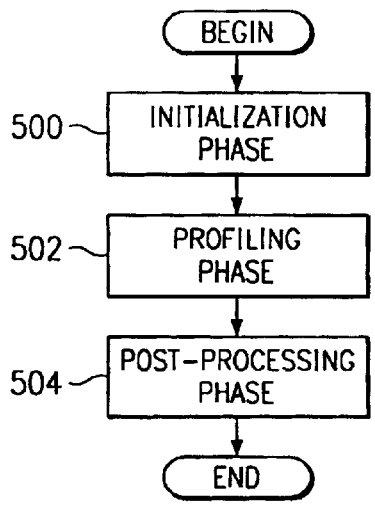
FIG. 5 is an illustration depicting various phases in profiling the active processes in an operating system.

With reference now to FIG. 5, a diagram depicts various phases in profiling the processes active in an operating system. Subject to memory constraints, the generated trace output may be as long and as detailed as the analyst requires for the purpose of profiling a particular program.

An initialization phase 500 is used to capture the state of the client machine at the time tracing is initiated. This trace initialization data includes trace records that identify all existing threads, all loaded classes, and all methods for the loaded classes. Records from trace data captured from hooks are written to indicate thread switches, interrupts, and loading and unloading of classes and jitted methods. Any class which is loaded has trace records that indicate the name of the class and its methods. In the depicted example, four byte IDs are used as identifiers for threads, classes, and methods. These IDs are associated with names that have been output in the records. A record is written to indicate when all of the start up information has been written.

Next, during the profiling phase 502, trace records are written to a trace buffer or trace file. In the present invention, a trace buffer may have a combination of types of records, such as those that may originate from a trace hook executed in response to a particular type of event, e.g., a method entry or method exit, and those that may originate from a stack walking function executed in response to a timer interrupt, e.g., a stack unwind record, also called a call stack record.

For example, the following process may occur during the profiling phase if the user of the profiling utility has requested sample-based profiling information. Each time a particular type of timer interrupt occurs, a trace record is written, which indicates the system program counter. This system program counter may be used to identify the routine that is interrupted. In the depicted example, a timer interrupt is used to initiate gathering of trace data. Of course, other types of interrupts may be used other than timer interrupts. Interrupts based on a programmed performance monitor event or other types of periodic events may be employed.

In the post-processing phase 504, the data collected in the trace buffer is sent to a trace file for post-processing. In one configuration, the file may be sent to a server, which determines the profile for the processes on the client machine. Of course, depending on available resources, the post-processing also may be performed on the client machine. In post-processing phase 504, B-trees and/or hash tables may be employed to maintain names associated the records in the trace file to be processed. A hash table employs hashing to convert an identifier or a key, meaningful to a user, into a value for the location of the corresponding data in the table. While processing trace records, the B-trees and/or hash tables are updated to reflect the current state of the client machine, including newly loaded jitted code or unloaded code. Also, in the post-processing phase 504, each trace record is processed in a serial manner. As soon as the indicator is encountered that all of the startup information has been processed, trace records from trace hooks and trace records from timer interrupts are then processed. Timer interrupt information from the timer interrupt records are resolved with existing hash tables. In addition, this information identifies the thread and function being executed. The data is stored in hash tables with a count identifying the number of timer tick occurrences associated with each way of looking at the data. After all of the trace records are processed, the information is formatted for output in the form of a report.

Alternatively, trace information may be processed on-the-fly so that trace data structures are maintained during the profiling phase. In other words, while a profiling function, such as a timer interrupt, is executing, rather than (or in addition to) writing trace records to a buffer or file, the trace record information is processed to construct and maintain any appropriate data structures.

For example, during the processing of a timer interrupt during the profiling phase, a determination could be made as to whether the code being interrupted is being interpreted by the Java interpreter. If the code being interrupted is interpreted, the method ID of the method being interpreted may be placed in the trace record. In addition, the name of the method may be obtained and placed in the appropriate B-tree. Once the profiling phase has completed, the data structures may contain all the information necessary for generating a profile report without the need for post-processing of the trace file.

Figure 6:
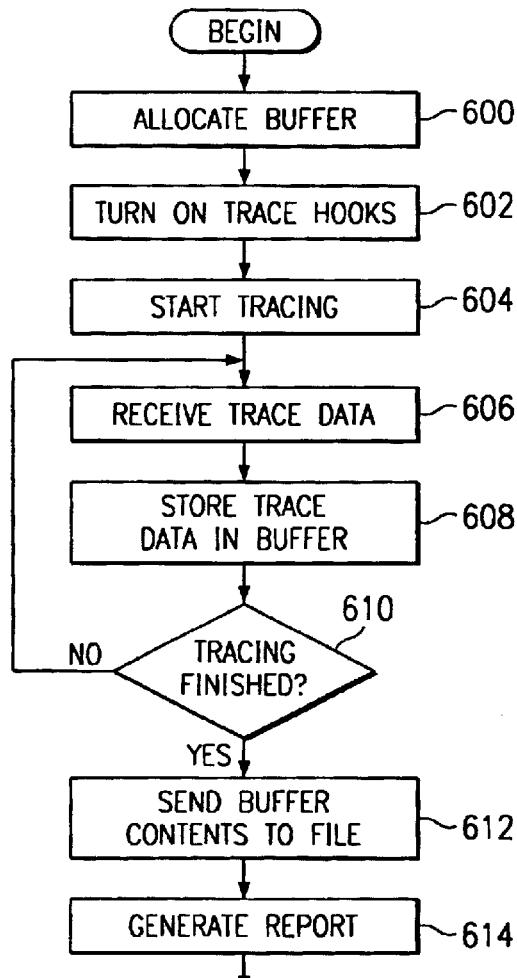
FIG. 6 is a flowchart depicting a process used by a trace program for generating trace records from processes executing on a data processing system.

With reference now to FIG. 6, a flowchart depicts a process used by a trace program for generating trace records from processes executing on a data processing system. FIG. 6 provides further detail concerning the generation of trace records that were not described with respect to FIG. 5.

Trace records may be produced by the execution of small pieces of code called "hooks". Hooks may be inserted in various ways into the code executed by processes, including statically (source code) and dynamically (through modification of a loaded executable). This process is employed after trace hooks have already been inserted into the process or processes of interest. The process begins by allocating a buffer (step 600), such as buffer 404 in FIG. 4. Next, in the depicted example, trace hooks are turned on (step 602), and tracing of the processes on the system begins (step 604). Trace data is received from the processes of interest (step 606). This type of tracing may be performed during phases 500 and/or 502. This trace data is stored as trace records in the buffer (step 608). A determination is made as to whether tracing has finished (step 610). Tracing finishes when the trace buffer has been filled or the user stops tracing via a command and requests that the buffer contents be sent to file. If tracing has not finished, the process returns to step 606 as described above.

Otherwise, when tracing is finished, the buffer contents are sent to a file for post-processing (step 612). A report is then generated in post-processing (step 614) with the process terminating thereafter.

Although the depicted example uses post-processing to analyze the trace records, the processes of the present invention may be used to process trace information in real-time depending on the implementation.

Figure 7:
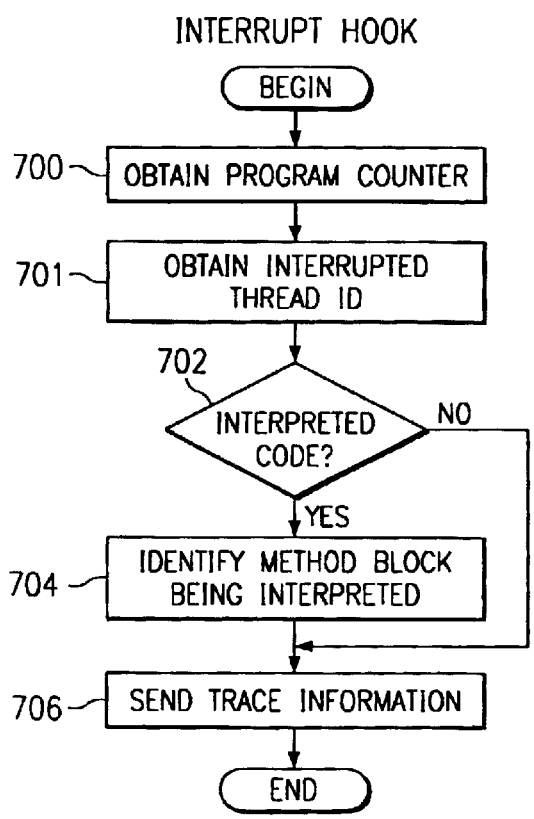
FIG. 7 is a flowchart depicting a process used in a system interrupt handler trace hook.

With reference now to FIG. 7, a flowchart depicts a process that may be used during an interrupt handler trace hook.

The process begins by obtaining a program counter (step 700). Typically, the program counter is available in one of the saved program stack areas. Thereafter, a determination is made as to whether the code being interrupted is interpreted code (step 702). This determination may be made by determining whether the program counter is within an address range for the interpreter used to interpret bytecodes. If the code being interrupted is interpreted, a method block address is obtained for the code being interpreted. A trace record is then written (step 706). The trace record is written by sending the trace information to a trace program, such as trace program 400, which generates trace records for post-processing in the depicted example. This trace record is referred to as an interrupt record, or an interrupt hook.

This type of trace may be performed during phase 502. Alternatively, a similar process, i.e. determining whether code that was interrupted is interpreted code, may occur during post-processing of a trace file.

A set of processes may be employed to obtain sample-based profiling information. As applications execute, the applications may be periodically interrupted in order to obtain information about the current runtime environment. This information may be written to a buffer or file for post-processing, or the information may be processed on-the-fly into data structures representing an ongoing history of the runtime environment. FIGS. 8 and 9 describe sample-based profiling in more detail.

A sample-based profiler may obtain information from the stack of an interrupted thread. The thread is interrupted by a software timer interrupt available in many operating systems. The user of the trace facility selects either the program counter option or the stack unwind option, which may be accomplished by enabling one major code or another major code, as described further below. This timer interrupt is employed to sample information from a call stack. By walking back up the call stack, a complete call stack can be obtained for analysis. A "stack walk" may also be described as a "stack unwind", and the process of "walking the stack" may also be described as "unwinding the stack." Each of these terms illustrates a different metaphor for the process. The process can be described as "walking" as the process must obtain and process the stack frames step-by-step or frame-by-frame. The process may also be described as "unwinding" as the process must obtain and process the stack frames that point to one another, and these pointers and their information must be "unwound" through many pointer dereferences.

The stack unwind follows the sequence of functions/method calls at the time of the interrupt. A call stack is an ordered list of routines plus offsets within routines (i.e. modules, functions, methods, etc.) that have been entered during execution of a program. For example, if routine A calls routine B, and then routine B calls routine C, while the processor is executing instructions in routine C, the call stack is ABC. When control returns from routine C back to routine B, the call stack is AB. For more compact presentation and ease of interpretation within a generated report, the names of the routines are presented without any information about offsets. Offsets could be used for more detailed analysis of the execution of a program, however, offsets are not considered further herein.

Thus, during timer interrupt processing or at post-processing, the generated sample-based profile information reflects a sampling of call stacks, not just leaves of the possible call stacks, as in some program counter sampling techniques. A leaf is a node at the end of a branch, i.e. a node that has no descendants. A descendant is a child of a parent node, and a leaf is a node that has no children.

With reference now FIG. 8, a diagram depicts the call stack containing stack frames. A "stack" is a region of reserved memory in which a program or programs store status data, such as procedure and function call addresses, passed parameters, and sometimes local variables. A "stack frame" is a portion of a thread's stack that represents local storage (arguments, return addresses, return values, and local variables) for a single function invocation. Every active thread of execution has a portion of system memory allocated for its stack space. A thread's stack consists of sequences of stack frames. The set of frames on a thread's stack represent the state of execution of that thread at any time. Since stack frames are typically interlinked (e.g., each stack frame points to the previous stack frame), it is often possible to trace back up the sequence of stack frames and develop the "call stack". A call stack represents all not-yet-completed function calls—in other words, it reflects the function invocation sequence at any point in time.

Call stack 800 includes information identifying the routine that is currently running, the routine that invoked it, and so on all the way up to the main program. Call stack 800 includes a number of stack frames 802, 804, 806, and 808. In the depicted example, stack frame 802 is at the top of call stack 800, while stack frame 808 is located at the bottom of call stack 800. The top of the call stack is also referred to as the "root". The timer interrupt (found in most operating systems) is modified to obtain the program counter value (pcv) of the interrupted thread, together with the pointer to the currently active stack frame for that thread. In the Intel architecture, this is typically represented by the contents of registers: EIP (program counter) and EBP (pointer to stack frame). By accessing the currently active stack frame, it is possible to take advantage of the (typical) stack frame linkage convention in order to chain all of the frames together. Part of the standard linkage convention also dictates that the function return address be placed just above the invoked-function's stack frame; this can be used to ascertain the address for the invoked function. While this discussion employs an Intel-based architecture, this example is not a restriction. Most architectures employ linkage conventions that can be similarly navigated by a modified profiling interrupt handler.

When a timer interrupt occurs, the first parameter acquired is the program counter value. The next value is the pointer to the top of the current stack frame for the interrupted thread. In the depicted example, this value would point to EBP 808a in stack frame 808. In turn, EBP 808 points to EBP 806a in stack frame 806, which in turn points to EBP 804a in stack frame 804. In turn, this EBP points to EBP 802a in stack frame 802. Within stack frames 802–808 are EIPs 802b–808b, which identify the calling routine's return address. The routines may be identified from these addresses. Thus, routines are defined by collecting all of the return addresses by walking up or backwards through the stack.

With reference now to the FIG. 9, an illustration of a call stack is depicted. A call stack, such as call stack 900 is obtained by walking the call stack. A call stack is obtained each time a periodic event, such as, for example, a timer interrupt occurs. These call stacks may be stored as call stack unwind trace records (also called merely "stack unwinds") within the trace file for post-processing or may be processed on-the-fly while the program continues to execute.

In the depicted example, call stack 900 contains a pid 902, which is the process identifier, and a tid 904, which is the thread identifier. Call stack 900 also contains addresses addr1 906, addr2 908 . . . addrN 910. In this example, addr1 906 represents the value of the program counter at the time of the interrupt. This address occurs somewhere within the scope of the interrupted function. addr2 908 represents an address within the process that called the function that was interrupted. For Intel-processor-based data processing systems, it represents the return address for that call; decrementing that value by 4 results in the address of the actual call, also known as the call-site. This corresponds with EIP 808b in FIG. 8; addrN 910 is the top of the call stack (EIP 802b). The call stack that would be returned if the timer interrupt interrupted the thread whose call stack state is depicted in FIG. 8 would consist of: a pid, which is the process id of the interrupted thread; a tid, which is the thread id for the interrupted thread; a pcv, which is a program counter value (not shown on FIG. 8) for the interrupted thread; EIP 808b; EIP 806b; EIP 804b; and EIP 802b. In terms of FIG. 9, pcv=addr1, EIP 808b=addr2, EIP 806b=addr3, EIP 804b=addr4, EIP 802b=addr5.

With reference now to FIG. 10A, a diagram of a program execution sequence along with the state of the call stack at each function entry/exit point is provided. The illustration shows entries and exits occurring at regular time intervals, but this is only a simplification for the illustration. If each function (A, B, C, and X in the figure) were instrumented with entry/exit event hooks, then complete accounting of the time spent within and below each function would be readily obtained. Note in FIG. 10A that at time 0, the executing thread is in routine C. The call stack at time 0 is C. At time 1, routine C calls routine A, and the call stack becomes CA and so on. It should be noted that the call stack in FIG. 10A is a reconstructed call stack that is generated by processing the event-based trace records in a trace file to follow such events as method entries and method exits.

The accounting technique and data structure are described in more detail further below. Unfortunately, this type of instrumentation can be expensive, can introduce bias, and in some cases, can be difficult to apply. Sample-based profiling, during which the sampling would be limited to sampling the program's call stack, helps to alleviate the performance bias and other complications that entry/exit hooks can produce.

Consider FIG. 10B, in which the same program is executed but is being sampled on a regular basis. In the example, the interrupt occurs at a frequency equivalent to two timestamp values. Each sample includes a snapshot of the interrupted thread's call stack. Not all call stack combinations are seen with this technique—for example, note that routine X does not show up at all in the set of call stack samples in FIG. 10B. This is an acceptable limitation of sampling. The idea is that with an appropriate sampling rate (e.g., 30–1000 times per second), the call stacks in which most of the time is spent will be identified. Although some call stacks are omitted, it is a minor issue provided these call stacks are combinations for which little time is consumed.

In the event-based traces, there is a fundamental assumption that the traces contain information about routine entries and matching routine exits. Often, entry-exit pairs are nested in the traces because routines call other routines. Time spent (or memory consumed) between entry into a routine and exit from the same routine is attributed to that routine, but a user of a profiling tool may want to distinguish between time spent directly in a routine and time spent in other routines that it calls.

FIG. 10C shows an example of the manner in which time may be expended by two routines: a program's "main" calls routine A at time "t" equal to zero; routine A computes for 1 ms and then calls routine B; routine B computes for 8 ms and then returns to routine A; routine A computes for 1 ms and then returns to "main". From the point of view of "main", routine A took 10 ms to execute, but most of that time was spent executing instructions in routine B and was not spent executing instructions within routine A. This is a useful piece of information for a person attempting to optimize the example program. In addition, if routine B is called from many places in the program, it might be useful to know how much of the time spent in routine B was on behalf of (or when called by) routine A and how much of the time was on behalf of other routines.

A fundamental concept in the output provided by the methods described herein is the call stack. The call stack consists of the routine that is currently running, the routine that invoked it, and so on all the way up to main. A profiler may add a higher, thread level with the pid/tid (the process IDs and thread IDs). In any case, an attempt is made to follow the trace event records, such as method entries and exits, as shown in FIG. 10A, to reconstruct the structure of the call stack frames while the program was executing at various times during the trace.

The post-processing of a trace file may result in a report consisting of three kinds of time spent in a routine, such as routine A: (1) base time—the time spent executing code in routine A itself; (2) cumulative time (or "CUM time" for short)—the time spent executing in routine A plus all the time spent executing every routine that routine A calls (and all the routines they call, etc.); and (3) wall-clock time or elapsed time. This type of timing information may be obtained from event-based trace records as these records have timestamp information for each record.

A routine's cumulative time is the sum of all the time spent executing the routine plus the time spent executing any other routine while that routine is below it on the call stack. In the example above in FIG. 10C, routine A's base time is 2 ms, and its cumulative time is 10 ms. Routine B's base time is 8 ms, and its cumulative time is also 8 ms because it does not call any other routines. It should be noted that cumulative time may not be generated if a call stack tree is being generated on-the-fly—cumulative time may only be computed after the fact during the post-processing phase of a profile utility.

For wall-clock or elapsed time, if while routine B was running, the system fielded an interrupt or suspended this thread to run another thread, or if routine B blocked waiting on a lock or I/O, then routine B and all the entries above routine B on the call stack accumulate elapsed time but not base or cumulative time. Base and cumulative time are unaffected by interrupts, dispatching, or blocking. Base time only increases while a routine is running, and cumulative time only increases while the routine or a routine below it on the call stack is running.

In the example in FIG. 10C, routine A's elapsed time is the same as its cumulative time—10 ms. Changing the example slightly, suppose there was a 1 ms interrupt in the middle of B, as shown in FIG. 10D. Routine A's base and cumulative time are unchanged at 2 ms and 10 ms, but its elapsed time is now 11 ms.

Although base time, cumulative time and elapsed time were defined in terms of processor time spent in routines, profiling is useful for attributing consumption of almost any system resource to a set of routines, as described in more detail below with respect to FIG. 11B. Referring to FIG. 10C again, if routine A initiated two disk I/O's, and then routine B initiated three more I/O's when called by routine A, routine A's "base I/O's" are two and routine A's "cumulative I/O's" are five. "Elapsed I/O's" would be all I/O's, including those by other threads and processes, that occurred between entry to routine A and exit from routine A. More general definitions for the accounting concepts during profiling would be the following: base—the amount of the tracked system resource consumed directly by this routine; cumulative—the amount of the tracked system resource consumed by this routine and all routines below it on the call stack; elapsed—the total amount of the tracked system resource consumed (by any routine) between entry to this routine and exit from the routine.

Figure 11A:
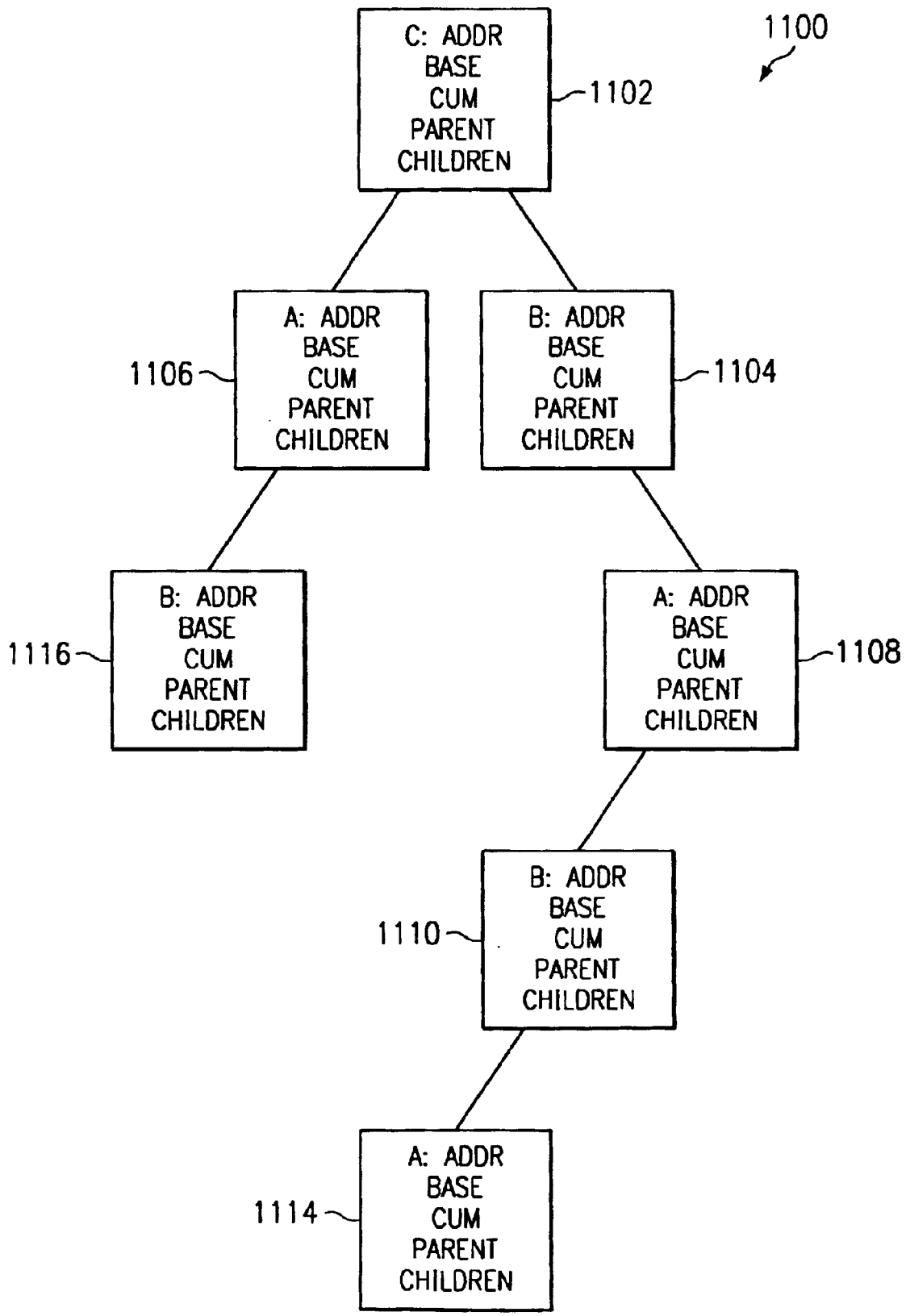
FIG. 11A is a diagram depicting a tree structure generated from sampling a call stack.

With reference now to FIG. 11A, a diagram depicts a tree structure generated from trace data. This figure illustrates a call stack tree 1100 in which each node in tree structure 1100 represents a function entry point.

Additionally, in each node in tree structure 1100, a number of statistics are recorded. In the depicted example, each node, nodes 1102–1108, contains an address (addr), a base time (BASE), cumulative time (CUM) and parent and children pointers. As noted above, this type of timing information may be obtained from event-based trace records as these records have timestamp information for each record. The address represents a function entry point. The base time represents the amount of time consumed directly by the thread executing this function. The cumulative time is the amount of time consumed by the thread executing this function and all functions below it on the call stack. In the depicted example, pointers are included for each node. One pointer is a parent pointer, a pointer to the node's parent. Each node also contains a pointer to each child of the node.

Those of ordinary skill in the art will appreciate that tree structure 1100 may be implemented in a variety of ways and that many different types of statistics may be maintained at the nodes other than those in the depicted example.

The call stack is developed from looking back at all return addresses. These return addresses will resolve within the bodies of those functions. This information allows for accounting discrimination between distinct invocations of the same function. In other words, if function X has 2 distinct calls to function A, the time associated with those calls can be accounted for separately. However, most reports would not make this distinction.

Figures 11B, 12:
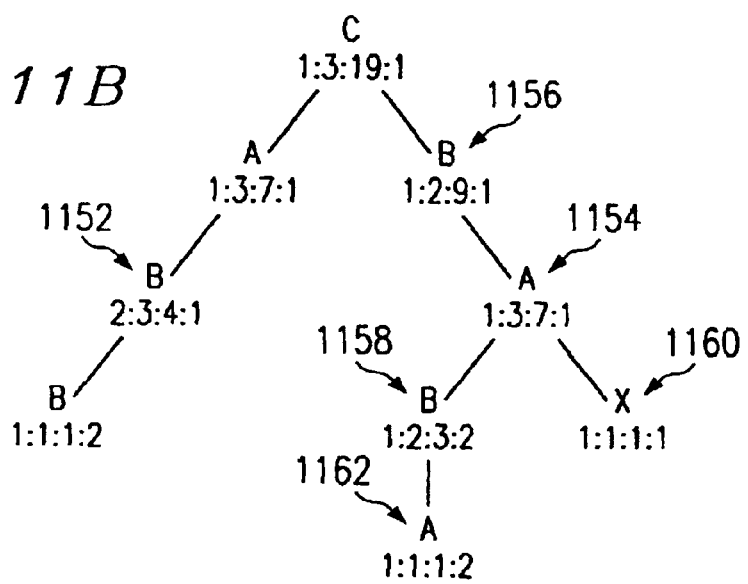
FIG. 11B is a diagram depicting an event tree which reflects call stacks observed during system execution.
FIG. 12 is a table depicting a call stack tree.

With reference now to FIG. 11B, a call stack tree which reflects call stacks observed during a specific example of system execution will now be described. At each node in the tree, several statistics are recorded. In the example shown in FIG. 11B, the statistics are time-based statistics. The particular statistics shown include the number of distinct times the call stack is produced, the sum of the time spent in the call stack, the total time spent in the call stack plus the time in those call stacks invoked from this call stack (referred to as cumulative time), and the number of instances of this routine above this instance (indicating depth of recursion).

For example, at node 1152 in FIG. 11B, the call stack is CAB, and the statistics kept for this node are 2:3:4:1. Note that call stack CAB is first produced at time 2 in FIG. 10A, and is exited at time 3. Call stack CAB is produced again at time 4, and is exited at time 7. Thus, the first statistic indicates that this particular call stack, CAB, is produced twice in the trace. The second statistic indicates that call stack CAB exists for three units of time (at time 2, time 4, and time 6). The third statistic indicates the cumulative amount of time spent in call stack CAB and those call stacks invoked from call stack CAB (i.e., those call stacks having CAB as a prefix, in this case CABB). The cumulative time in the example shown in FIG. 11B is four units of time. Finally, the recursion depth of call stack CAB is one, as none of the three routines present in the call stack have been recursively entered.

Those skilled in the art will appreciate that the tree structure depicted in FIG. 11B may be implemented in a variety of ways, and a variety of different types of statistics may be maintained at each node. In the described embodiment, each node in the tree contains data and pointers. The data items include the name of the routine at that node, and the four statistics discussed above. Of course, many other types of statistical information may be stored at each node. In the described embodiment, the pointers for each node include a pointer to the node's parent, a pointer to the first child of the node (i.e. the left-most child), a pointer to the next sibling of the node, and a pointer to the next instance of a given routine in the tree. For example, in Figure 11B, node 1154 would contain a parent pointer to node 1156, a first child pointer to node 1158, a next sibling pointer equal to NULL (note that node 1154 does not have a next sibling), and a next instance pointer to node 1162. Those skilled in the art will appreciate that other pointers may be stored to make subsequent analysis more efficient. In addition, other structural elements, such as tables for the properties of a routine that are invariant across instances, e.g., the routine's name, may also be stored.

The type of performance information and statistics maintained at each node are not constrained to time-based performance statistics. The present invention may be used to present many types of trace information in a compact manner which supports performance queries. For example, rather than keeping statistics regarding time, tracing may be used to track the number of Java bytecodes executed in each method (i.e., routine) called. The tree structure of the present invention would then contain statistics regarding bytecodes executed rather than time. In particular, the quantities recorded in the second and third categories would reflect the number of bytecodes executed rather than the amount of time spent in each method.

Tracing may also be used to track memory allocation and deallocation. Every time a routine creates an object, a trace record could be generated. The tree structure of the present invention would then be used to efficiently store and retrieve information regarding memory allocation. Each node would represent the number of method calls, the amount of memory allocated within a method, the amount of memory allocated by methods called by the method, and the number of methods above this instance (i.e., the measure of recursion). Those skilled in the art will appreciate that the tree structure of the present invention may be used to represent a variety of performance data in a manner which is very compact, and allows a wide variety of performance queries to be performed.

The tree structure shown in FIG. 11B depicts one way in which data may be pictorially presented to a user. The same data may also be presented to a user in tabular form as shown in FIG. 12.

With reference now to FIG. 12, a call stack tree presented as a table will now be described. Note that FIG. 12 contains a routine, pt_pidtid, which is the main process/thread which calls routine C. Table 12 includes columns of data for Level 1230, RL 1232, Calls 1234, Base 1236, Cum 1238, and Indent 1240. Level 1230 is the tree level (counting from the root as level 0) of the node. RL 1232 is the recursion level. Calls 1234 is the number of occurrences of this particular call stack, i.e., the number of times this distinct call stack configuration occurs. Base 1236 is the total observed time in the particular call stack, i.e., the total time that the stack had exactly these routines on the stack. Cum 1238 is the total time in the particular call stack plus deeper levels below it. Indent 1240 depicts the level of the tree in an indented manner. From this type of call stack configuration information, it is possible to infer each unique call stack configuration, how many times the call stack configuration occurred, and how long it persisted on the stack. This type of information also provides the dynamic structure of a program, as it is possible to see which routine called which other routine. However, there is no notion of time-order in the call stack tree. It cannot be inferred that routines at a certain level were called before or after other routines on the same level.

Figure 13:
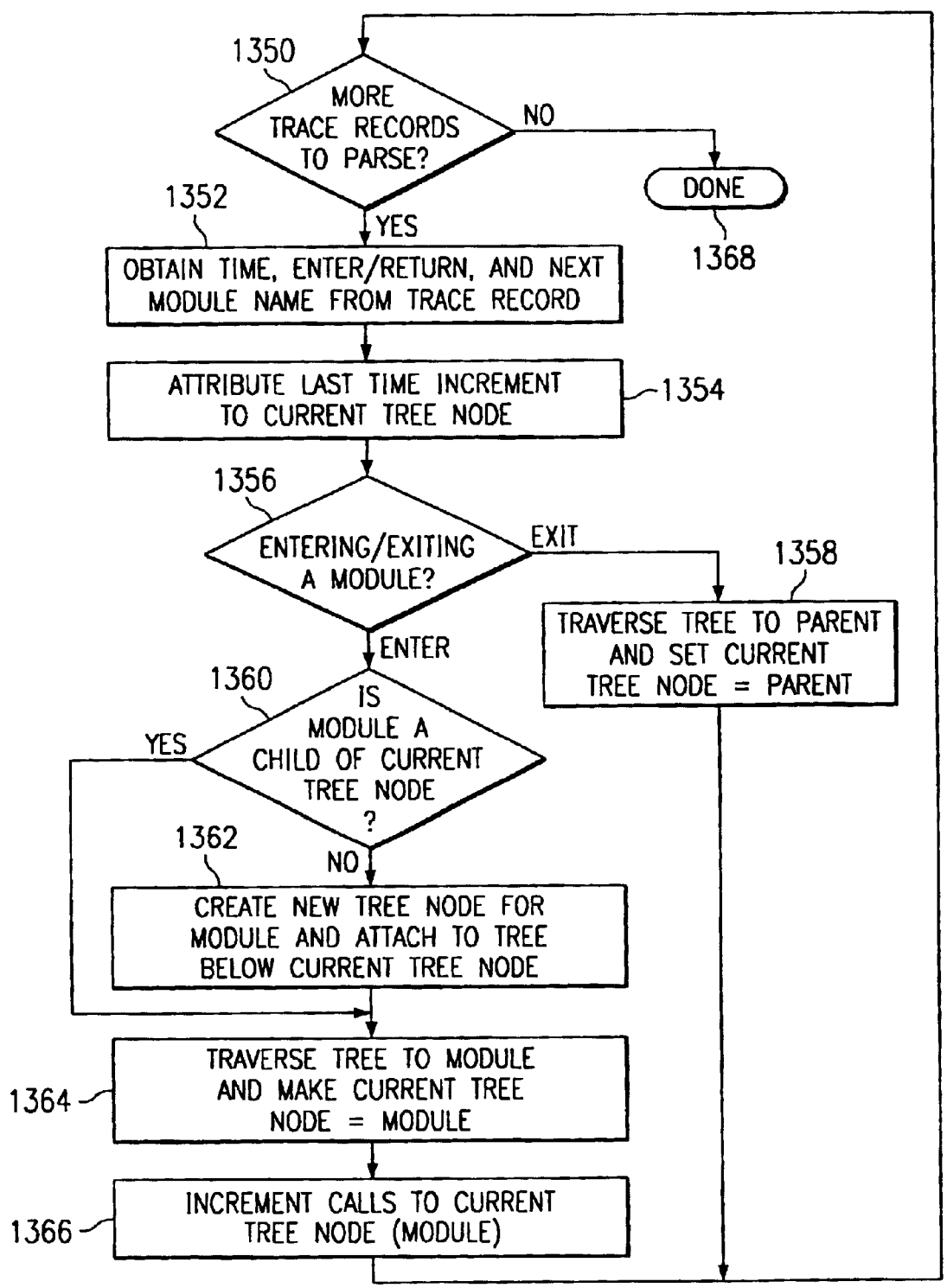
FIG. 13 is a flow chart depicting a method for building a call stack tree using a trace text file as input.

The pictorial view of the call stack tree, as illustrated in FIG. 11B, may be built dynamically on-the-fly or built statically using a trace file as input. FIG. 13 depicts a flow chart of a method for building a call stack tree using a trace file as input. In FIG. 13, the call stack tree is built to illustrate module entry and exit points.

With reference now to FIG. 13, it is first determined if there are more trace records in the trace file (step 1350). If so, several pieces of data are obtained from the trace record, including the time, whether the event is an enter or an exit, and the module name (step 1352). Next, the last time increment is attributed to the current node in the tree (step 1354). A check is made to determine if the trace record is an enter or an exit record (step 1356). If it is an exit record, the tree is traversed to the parent (using the parent pointer), and the current tree node is set equal to the parent node (step 1358). If the trace record is an enter record, a check is made to determine if the module is already a child node of the current tree node (step 1360). If not, a new node is created for the module and it is attached to the tree below the current tree node (step 1362). The tree is then traversed to the module's node, and the current tree node is set equal to the module node (step 1364). The number of calls to the current tree node is then incremented (step 1366). This process is repeated for each trace record in the trace output file until there are no more trace records to parse (step 1368).

Figure 14:
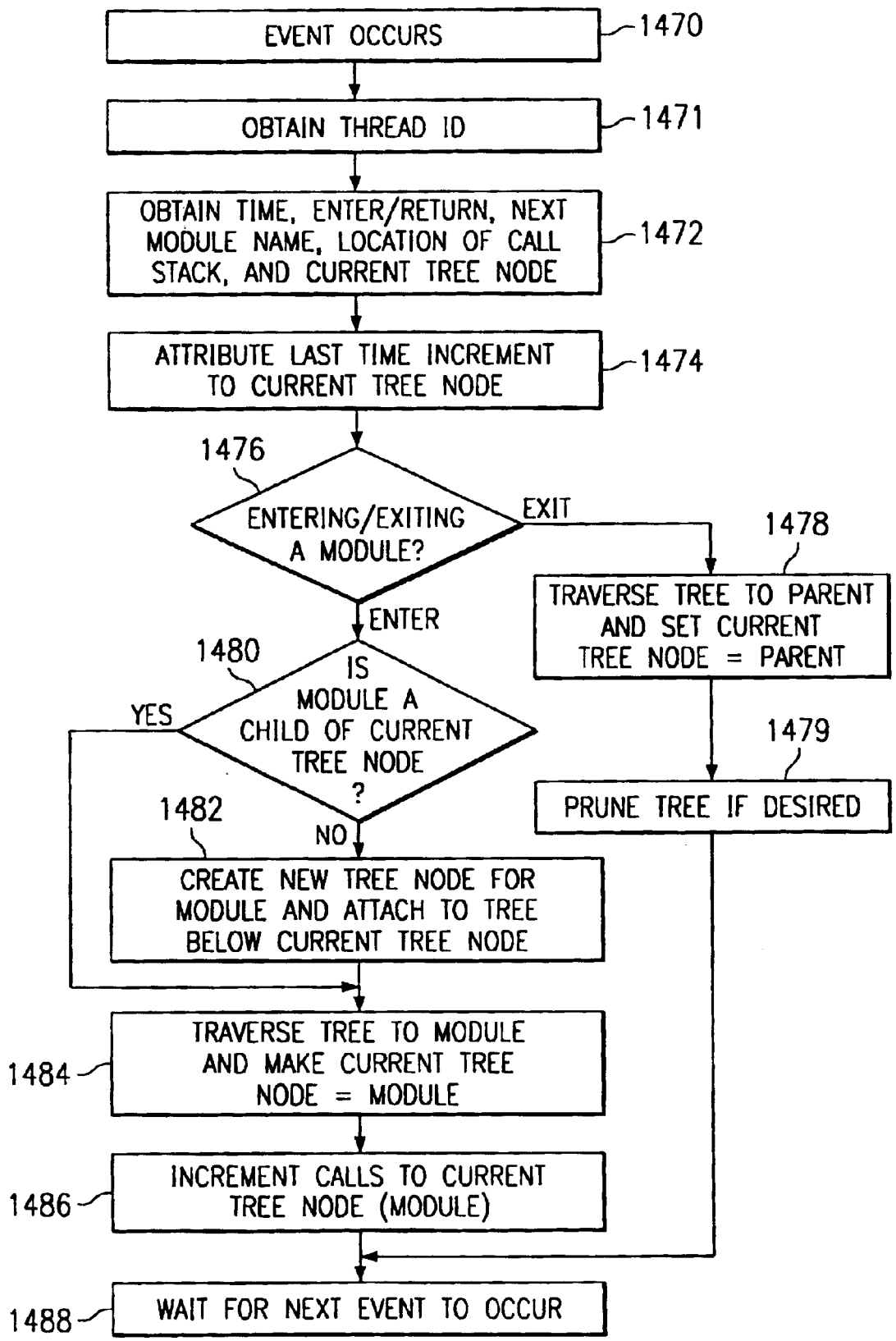
FIG. 14 is a flow chart depicting a method for building a call stack tree dynamically as tracing is taking place during system execution.

With reference now to FIG. 14, a flow chart depicts a method for building a call stack tree dynamically as tracing is taking place during system execution. In FIG. 14, as an event is logged, it is added to the tree in real time. Preferably, a separate call stack tree is maintained for each thread. The call stack tree reflects the call stacks recorded to date, and a current tree node field indicates the current location in a particular tree. When an event occurs (step 1470), the thread ID is obtained (step 1471). The time, type of event (i.e., in this case, whether the event is a method entry or exit), the name of the module (i.e., method), location of the thread's call stack, and location of the thread's "current tree node" are then obtained (step 1472). The last time increment is attributed to the current tree node (step 1474). A check is made to determine if the trace event is an enter or an exit event (step 1476). If it is an exit event, the tree is traversed to the parent (using the parent pointer), and the current tree node is set equal to the parent node (step 1478). At this point, the tree can be dynamically pruned in order to reduce the amount of memory dedicated to its maintenance (step 1479). Pruning is discussed in more detail below. If the trace event is an enter event, a check is made to determine if the module is already a child node of the current tree node (step 1480). If not, a new node is created for the module, and it is attached to the tree below the current tree node (step 1482). The tree is then traversed to the module's node, and the current tree node is set equal to the module node (step 1484). The number of calls to the current tree node is then incremented (step 1486). Control is then passed back to the executing module, and the dynamic tracing/reduction program waits for the next event to occur (step 1488).

One of the advantages of using the dynamic tracing/reduction technique described in FIG. 14 is its enablement of long-term system trace collection with a finite memory buffer. Very detailed performance profiles may be obtained without the expense of an "infinite" trace buffer. Coupled with dynamic pruning, the method depicted in FIG. 14 can support a fixed-buffer-size trace mechanism.

The use of dynamic tracing and reduction (and dynamic pruning in some cases) is especially useful in profiling the performance characteristics of long running programs. In the case of long running programs, a finite trace buffer can severely impact the amount of useful trace information that may be collected and analyzed. By using dynamic tracing and reduction (and perhaps dynamic pruning), an accurate and informative performance profile may be obtained for a long running program.

Many long-running applications reach a type of steady-state, where every possible routine and call stack is present in the tree and updating statistics. Thus, trace data can be recorded and stored for such applications indefinitely within the constraints of a bounded memory requirement using dynamic pruning. Pruning has value in reducing the memory requirement for those situations in which the call stacks are actually unbounded. For example, unbounded call stacks are produced by applications that load and run other applications.

Pruning can be performed in many ways, and a variety of pruning criteria is possible. For example, pruning decisions may be based on the amount of cumulative time attributed to a subtree. Note that pruning may be disabled unless the amount of memory dedicated to maintaining the call stack exceeds some limit. As an exit event is encountered (such as step 1478 in FIG. 14), the cumulative time associated with the current node is compared with the cumulative time associated with the parent node. If the ratio of these two cumulative times does not exceed a pruning threshold (e.g., 0.1), then the current node and all of its descendants are removed from the tree. The algorithm to build the tree proceeds as before by traversing to the parent, and changing the current node to the parent.

Many variations of the above pruning mechanism are possible. For example, the pruning threshold can be raised or lowered to regulate the level of pruning from very aggressive to none. More global techniques are also possible, including a periodic sweep of the entire call stack tree, removing all subtrees whose individual cumulative times are not a significant fraction of their parent node's cumulative times.

Data reduction allows analysis programs to easily and quickly answer many questions regarding how computing time was spent within the traced program. This information may be gathered by "walking the tree" and accumulating the data stored at various nodes within the call stack tree, from which it can be determined the amount of time spent strictly within routine A, the total amount of time spent in routine A and in the routines called by routine A either directly or indirectly, etc.

With reference now to FIG. 15, a diagram of a record generated using the processes of present invention is depicted. Each routine in record 1500 is listed separately, along with information regarding the routine in FIG. 15. For example, calls column 1504 lists the number of times each routine has been called. BASE column 1506 contains the total time spent in the routine, while CUM column 1508 includes the cumulative time spent in the routine and all routines called by the routine. Name column 1512 contains the name of the routine.

With reference now to FIG. 16, a diagram of another type of report that may be produced is depicted. The report depicted in FIG. 16 illustrates much of the same information found in FIG. 15, but in a slightly different format. As with FIG. 15, diagram 1600 includes information on calls, base time, and cumulative time.

FIG. 16 shows a trace output containing times spent within various routines as measured in microseconds. FIG. 16 contains one stanza (delimited by horizontal lines) for each routine that appears in the trace output. The stanza contains information about the routine itself on the line labeled "Self", about who called it on lines labeled "Parent", and about who the routine called on lines labeled "Child". The stanzas are in order of cumulative time. The third stanza is about routine A, as indicated by the line beginning with "Self." The numbers on the "Self" line of this stanza show that routine A was called three times in this trace, once by routine C and twice by routine B. In the profile terminology, routines C and B are (immediate) parents of routine A. Routine A is a child of routines C and B. All the numbers on the "Parent" rows of the second stanza are breakdowns of routine A's corresponding numbers. Three microseconds of the seven microsecond total base time spent in A was when it was called by routine C, and three microseconds when it was first called by routine B, and another one microsecond when it was called by routine B for a second time. Likewise, in this example, half of routine A's fourteen microsecond cumulative time was spent on behalf of each parent.

Looking now at the second stanza, we see that routine C called routine B and routine A once each. All the numbers on "Child" rows are subsets of numbers from the child's profile. For example, of the three calls to routine A in this trace, one was by routine C; of routine A's seven microsecond total base time, three microseconds were while it was called directly by routine C; of routine A's fourteen microsecond cumulative time, seven microseconds was on behalf of routine C. Notice that these same numbers are the first row of the third stanza, where routine C is listed as one of routine A's parents.

The four relationships that are true of each stanza are summarized at the top of FIG. 16. First, the sum of the numbers in the Calls column for Parents equals the number of calls on the Self row. Second, the sum of the numbers in the Base column for Parents equals Self's base. Third, the sum of the numbers in the Cum column for Parents equals Self's Cum. These first three invariants are true because these characteristics are the definition of Parent; collectively they are supposed to account for all of Self's activities. Fourth, the Cum in the Child rows accounts for all of Self's Cum except for its own Base.

Program sampling may contain information from the call stack and may provide a profile reflecting the sampling of an entire call stack, not just the leaves. Furthermore, the sample-based profiling technique may also be applied to other types of stacks. For example, with Java programs, a large amount of time is spent in a routine called the "interpreter". If only the call stack was examined, the profile would not reveal much useful information. Since the interpreter also tracks information in its own stack, e.g., a Java stack (with its own linkage conventions), the process can be used to walk up the Java stack to obtain the calling sequence from the perspective of the interpreted Java program.

With reference now to FIG. 17, a figure depicts a report generated from a trace file containing both event-based profiling information, such as method entry/exits, and stack unwind information generated during sample-based profiling. FIG. 17 is similar to FIG. 12, in which a call stack tree is presented as a report, except that FIG. 17 contains embedded stack walking information. Call stack tree 1700 contains two stack unwinds generated within the time period represented by the total of 342 ticks. Stack unwind identifier 1702 denotes the beginning of stack unwind information 1706, with the names of routines that are indented to the right containing the stack information that the stack walking process was able to discern. Stack unwind identifier 1704 denotes the beginning of stack unwind information 1708. In this example, "J:" identifies an interpreted Java method and "F:" identifies a native function, such as a native function within JavaOS. A call from a Java method to a native method is via "ExecuteJava." Hence, at the point at which the stack walking process reaches a stack frame for an "ExecuteJava," it cannot proceed any further up the stack as the stack frames are discontinued. The process for creating a tree containing both event-based nodes and sample-based nodes is described in more detail further below. In this case, identifiers 1702 and 1704 also denote the major code associated with the stack unwind.

With reference now to FIGS. 18A–18B, tables depict major codes and minor codes that may be employed to instrument software modules for profiling. A set of codes may be used to turn on and off various types of profiling functions in a particular profiling session.

For example, as shown in FIGS. 18A–18B, the minor code for a stack unwind is designated as 0x7fffffff, which may be used for two different purposes. The first purpose, denoted with a major code of 0x40, is for a stack unwind during a timer interrupt. The second purpose, denoted with a major code of 0x41, is for a stack unwind in an instrumented routine. When the stack information is output into a trace file with its major and minor codes, the trace information that appears within the file can be analyzed in the appropriate manner indicated by the major and minor codes.

Other examples in the table show a profile or major code purpose of tracing jitted methods with a major code value of 0x50. Tracing of jitted methods may be distinguished based on the minor code that indicates method invocation or method exit. In contrast, a major code of 0x30 indicates a profiling purpose of instrumenting interpreted methods, while the minor code again indicates, with the same values, method invocation or method exit.

Referring back to FIG. 17, the connection can be made between the use of major and minor codes, the instrumentation of code, and the post-processing of profile information. In the generated report shown in FIG. 17, the stack unwind identifiers can be seen to be equal to 0x40, which, according to the tables in FIGS. 18A–18B, is a stack unwind generated in response to a timer interrupt. This type of stack unwind may have occurred in response to an interrupt that was created in order to generate a sampled profile of the executing software.

As noted in the last column of the tables in FIGS. 18A–18B, by using a utility that places a hook into a software module to be profiled, a stack unwind may be instrumented into a routine. If so, the output for this type of stack unwind will be designated with a major code of 0x41.

While profiling an executable program, the profiler would ideally receive pairs of corresponding entry and exit events. However, this is often not the case. In a typical example, tracing may commence after a portion of the executable program has already been run. This may occur if the mechanism for initiating the profiler is activated in a dynamic manner. In this case, exit events may be received by the profiler without having previously received corresponding entry trace records, i.e. without having previously received a matching entry event. The exit event can be said to be "mismatched".

As an additional example, there may be several execution paths that occur during a profiling session that are not correctly instrumented as a practical matter. This often occurs within exception paths. In the case of exception paths, the profiler will receive entry events without corresponding exit events because an exception path inherently causes an abrupt exit from a routine or method.

In yet another example of unmatched events, the instrumentation of the executable code may not be performed automatically. In order to use event-based profiling, an executable program must be instrumented with entry and exit trace hooks. In the case of manually instrumented code, it is possible that a programmer can make a mistake and not place corresponding entry and exit trace hooks into a routine. In this case, it is possible for the profiler to receive an exit event for a routine without a corresponding entry trace record.

In each of these examples, it is important to determine the execution path flow and to construct a reasonable representation of the execution paths. One may attempt to detect and recover from these types of errors within the profiler. Trace processing may continue for all error cases, and in general, reasonable execution paths are determined for both common and unusual problems.

Error recovery processing may be accomplished both in real-time trace processing and in a post-processing phase of outputted trace data. During real-time trace processing, a call stack tree may be constructed, as described above with respect to FIG. 11A and FIG. 11B. At any time during the construction of the call stack tree, a pointer is maintained to a current node that represents the routine that was last identified to be executing.

If the event that is currently being processed is an entry event, it may be assumed that the entry event represents a call from the routine represented by the current node. Since it is not yet possible to determine whether an error has occurred in which an exit event may be missing in the execution flow preceding the event currently being processed, entry events are assumed not to contain an error condition. Although an error condition may subsequently be detected, processing for entry events proceeds in the same manner whether or not an error condition may have occurred within the execution flow represented by the generated events.

While processing an exit event, it is assumed that the exit event represents an exit from the current routine as represented in the call stack tree structure. However, the exit event may identify a routine that does not match the current tree node, i.e. the exit event and the current node in the call stack tree do not match, and the exit event is said to be "mismatched". Hence, at least one entry event is missing in the trace data. Although it is not possible to determine how many events may be missing from the trace data, one may attempt to determine a node within the call stack tree that represents the exit event that is currently being processed.

As an ancillary comment, it should be noted that when an entry event or exit event is received, a current timestamp (or other execution-related characteristic) may be obtained, and the time increment (or other execution-related metric) between the event currently being processed and the previous event is applied to the current node. This default rule works reasonably well, even in those cases in which an error is detected with mismatched entry and exit events, because the current node represents the last known routine to be executing, and at least some of the time (or other execution-related metric) between the last event and the event currently being processed has been spent within the current node.

Figure 19:
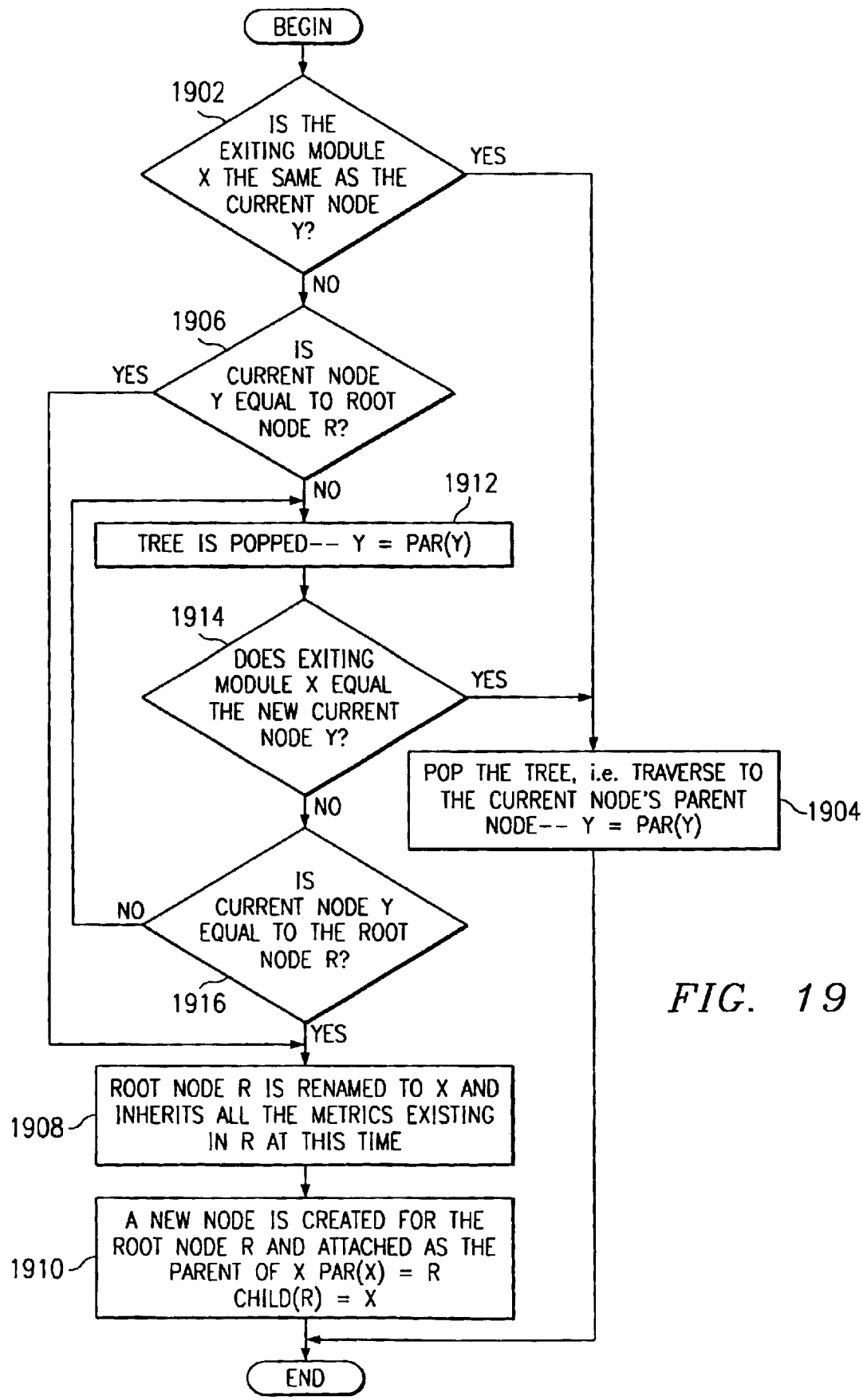
FIG. 19 is a flowchart depicting the processing of exit events, including error recovery processing, in an execution flow that may contain errors in the form of mismatched events.

With reference now to FIG. 19, a flowchart depicts the processing of exit events, including error recovery processing, in an execution flow that may contain errors in the form of missing or mismatched events. The process shown in the flowchart assumes that an event which is currently being processed has been determined to be an exit event. In this manner, the process shown in FIG. 19 may replace step 1478 shown in FIG. 14.

In this example, X is the module name of the module being exited by the exit event, Y is the module name of the current node of the call tree, and R is the module name of the root node. Certain relationships apply to the tree nodes, such as the parent of NODE is PAR(NODE), and the child of NODE is CHILD(NODE).

The process in FIG. 19 begins with a determination of whether the exiting module X is the same as the current node Y, i.e. whether the module name of exiting module X corresponds to the module name associated with current node Y (step 1902). If so, this is the normal exit with no error. The tree is popped, i.e., traversed to the current node's parent node (step 1904), and the process is complete with respect to the exit event which has just been processed.

If exiting module X is not equal to current node Y, then a determination is made as to whether the current node Y is equal to the root node R (step 1906). This case is the most normal error case, which would occur when the entry event corresponding to the exit event currently being processed occurred before the trace was turned on. If the current node is equal to the root node, then the tree is "repaired" by renaming the root node R to exiting module X and allowing module X to inherit all of the metrics existing in root node R at this time (step 1908). A new node is then created for the root of the tree and attached as the parent of the node for exiting module X, i.e. PAR(X)=R and CHILD(R)=X (step 1910). The tree is now in the same structural shape as if the trace started with an entry to module X. The process is then complete with respect to processing the exit event when the current node is the root node.

If the current node is not equal to the root node, then the tree is popped, i.e. the current node indicator or pointer points to the parent of the current node Y (step 1912). A determination is made as to whether the exiting module X is the same as the current node Y, i.e. whether the module name of exiting module X corresponds to the module name associated with current node Y (step 1914). If so, then processing proceeds to step 1904 to complete the processing of the exit event record that is currently being processed. In this situation, one or more tree pops were required to find a matching exit node. This can happen due to one of the following: (1) a long "jump" construct which is used to return from a nested error condition; (2) an uninstrumented exception processing path; or (3) faulty instrumentation resulting in one or more missing exit hooks.

If exiting module X is not equal to current node Y, then a determination is made as to whether the current node Y is equal to the root node R (step 1916). If not, then the process loops back to step 1912. If so, then the tree is "repaired" by branching to steps 1908 and 1910. However, the interpretation of the situation to be repaired is different than previously described. The determination in step 1916 detects a severe error, possibly due to instrumentation errors or trace gathering difficulties, and a severe error message may be issued as appropriate.

In this manner, the process described in FIG. 19 may be used to construct a call stack tree representation that provides useful information even though some of the nodes do not represent an exact correspondence to the execution flow of the executing program.

As noted above, tracing may commence after a portion of the executable program has already been run, which may cause missing entry and exit events in the trace flow, and when the profiler receives an event, the event does not match a node in the call stack tree. While this type of event mismatch may occur at the start of a profiling phase when tracing of a program commences, this type of event mismatch may also occur during sample-based profiling in accordance with a preferred embodiment of the present invention—if the generation of trace data has been paused and then resumed, then mismatched entry and exit events may appear in the execution flow. However, the process of pausing and resuming event-based profiling, i.e. sample-based profiling of events, has certain benefits compared to other manners of profiling.

Creating a call stack tree during continuous event-based profiling causes significant system performance degradation due to the tree building and metric accumulation activity associated with the profiling process. Sample-based profiling using stack unwinds is not always reliable and may have inherent implementation problems, such as the inability to follow a pointer chain in the call stack or the profiled program code does not follow standard conventions. Even if the stack unwinds are reliable, they do not provide information about the length of execution for the routines being profiled. Hence, periodic sampling of entry/exit hooks provides some structural and quantitative measures of a program's execution with less system performance degradation than fully continuous event-based profiling and without total reliance on stack unwinds.

Figure 20:
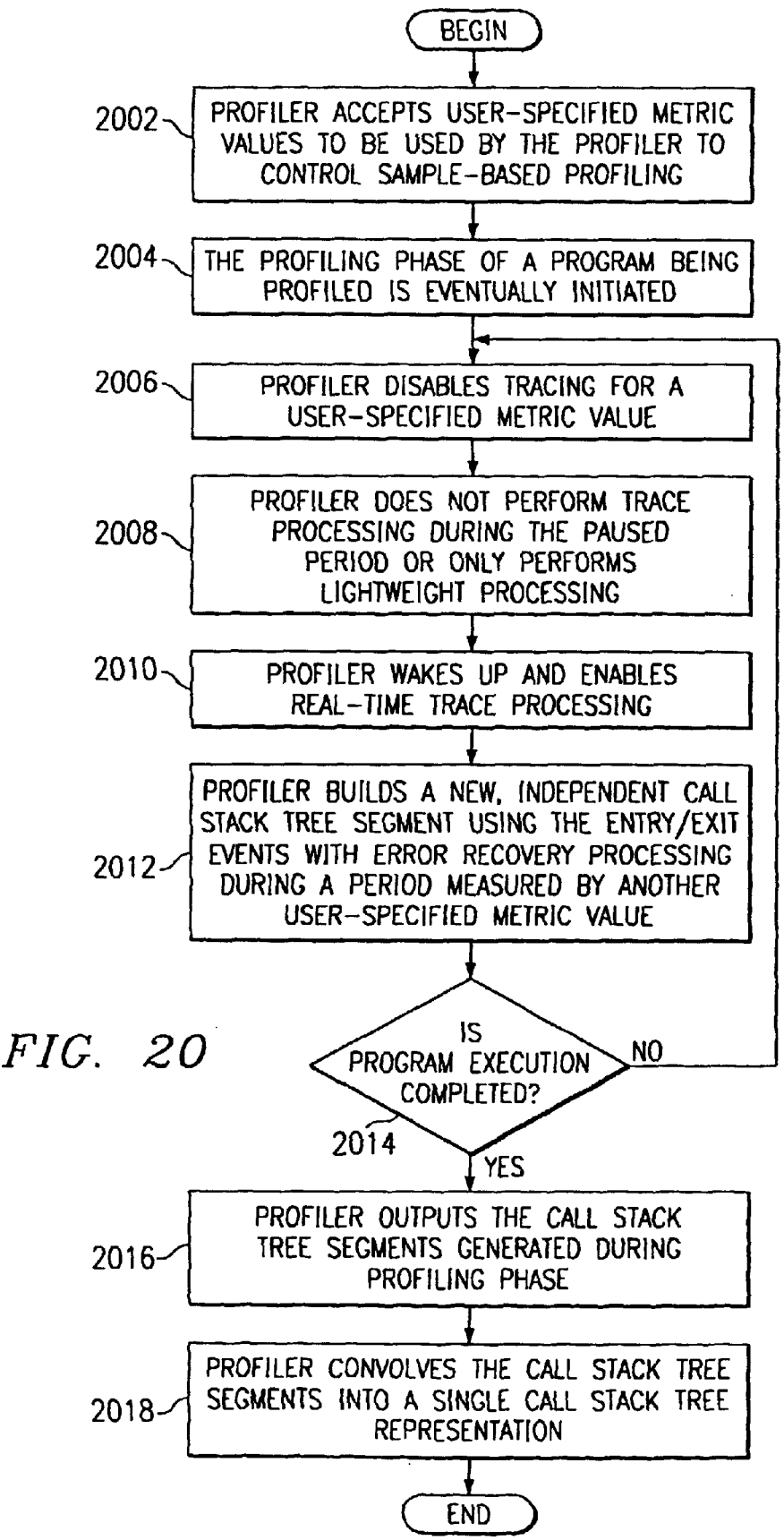
FIG. 20 is a flowchart depicting a process for sample-based profiling of entry/exit events employing user-specified sample metrics to build independent call stack tree segments.

With reference now to FIG. 20, a flowchart depicts a process for sample-based profiling of entry/exit events employing user-specified sample metrics to build independent call stack tree segments. The process assumes that the described actions are performed on a per thread basis, i.e. the profiler would perform similar actions or processing for each unique pidtid value, i.e. call stack tree segments are not only identifiable by sample period but are also identifiable by pidtid value. In addition, the profiler may maintain and increment a sequence value for the sample period that provides an ordinal number for the sample periods.

The process begins with the profiler accepting user-specified metric values to be used by the profiler to control sample-based profiling (step 2002). These metric values may be stored in environment variables, input through command line parameters, etc. Alternatively, the profiler contains default metric values so that the user is not required to input any metric values. At some point in time, the profiling phase of a program is eventually initiated (step 2004).

The profiler then disables tracing for a user-specified metric value (step 2006), and the profiler does not perform any trace processing during this period (step 2008), or possibly performs only lightweight processing. After this period, the profiler wakes up and enables real-time trace processing (step 2010). The profiler builds a new, independent call stack tree segment using the entry/exit events with error recovery processing during a period measured according to another user-specified metric value (step 2012).

A determination is then made as to whether the program execution has completed (step 2014), and if not, then the process loops back to step 2006 to continue profiling the execution of the program. If program execution is complete, then the profiler outputs the call stack tree segments generated during the profiling phase (step 2016). During the post-processing phase, the call stack tree segments are merged into a single call stack tree representation (step 2018), and the process is then complete. "Merging" a tree is defined as traversing a first tree to create a second tree which contains the union of the first tree and the second tree. In this case, all of the call stack tree segments are merged into a single tree, i.e. a single tree is generated through the union of all of the call stack tree segments.

Each call stack tree segment is a unique recording of the calling sequence between routines during its sample period. A call stack tree segment is properly classifiable as a tree data structure. An independent tree is generated for each periodic sample period, which creates a forest of trees based on pidtid values over time. Although each sample period creates an individual call stack tree, the term "call stack tree segment" is used to emphasize that each of these call stack trees from these periods may be relatively small compared to a full call stack tree that records the calling sequences between routines for an entire profiling run of an executable program. The term "call stack tree segment" is also used to emphasize that these call stack trees are merely a means to the end of eventually producing a resulting call stack tree for all of the sample periods. Hence, the information in a call stack tree segment is merely a "segment" of the profile information for one sample period compared to all of the profile information that is generated during the profiling of the program.

A call stack tree segment from a sample period is termed "independent" in that each call stack tree segment is considered to have its own root and its own nodes representing the progression of routine calls or method invocations between the routines as represented in the tree structure. However, the profiler may maintain another data structure which associatively stores these call stack tree segments—"independence" in this context does not require that each data structure is not linked to another data structure.

Since the call stack tree segments are identifiable by pidtid values, the profiler may maintain some type of data structure for each pidtid. For example, the profiler may maintain a linked list in which each element in the linked list is the root node of a completed call stack tree segment. In other words, related call stack tree segments may be associatively linked as required by the profiler to maintain and track the call stack tree segments.

The user may specify a sample time and number of events for each sample. During each sample, a call stack tree is generated. After the profiling phase is complete, the profiler may hold thousands of these trees, i.e. a "forest" of trees. Alternatively, the profiler may periodically output the call stack trees into a file for post-processing. This forest of trees may then be merged during post-processing.

For example, the user may specify a two second waiting or pausing period and a one thousand event tracing period. Therefore, every two seconds, the profiler should take one thousand event snapshots. After a thousand occurrences, the profiler would disable entry/exit event processing and wait for two seconds. After the profiler determines to begin trace processing again, which may occur after a timer interrupt, the profiler enables the entry/exit event processing and allows the event processing to continue. The profiler loops in this manner until the execution of the job is complete.

Alternatively, the sample could be defined in terms of time duration instead of events. For example, the user could specify a ten millisecond sample duration every second. In a preferred embodiment, the user may specify several types of execution-related metrics for either the waiting period and/or the tracing period. In addition, the profiler may monitor several different execution-related characteristics other than execution time in each routine.

Figure 21:
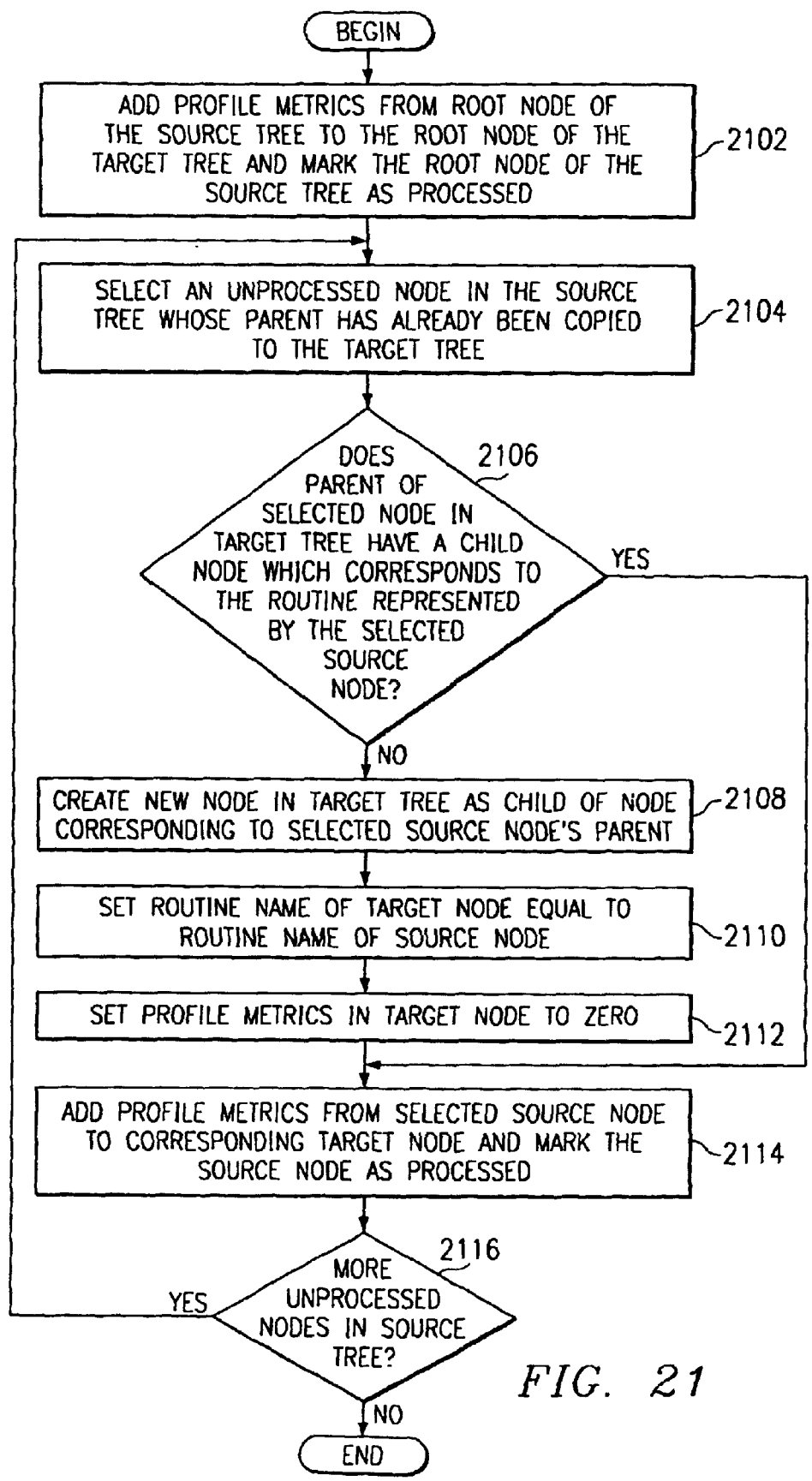
FIG. 21 is a flowchart depicting the process by which one tree, called the source tree, is added to a second tree, called the target tree, to obtain a union between the two trees.

With reference now to FIG. 21, a flowchart depicts the process by which one tree, called the source tree, is added to, or merged into, a second tree, called the target tree, to obtain a union between the two trees. The intent is to copy the source tree into the target tree starting from the root of the target tree. If any part of the source tree starting at its root already exists in the target tree as a child of its root, then the existing nodes in the target tree must be reused, increasing their profiling metrics, instead of creating new, duplicate nodes in the target tree.

Each source tree node, S, has a unique parent node, par(S) in the source tree by the definition of "tree", except for the root node, $S_{root}$ which has no parent. Also each S will eventually have a unique corresponding node T(S) in the target tree. Each S is copied to the target tree as a child of its parent's unique corresponding node in the target tree. In other words, if $S_1$ is a child of $S_2$ then $T(S_1)$ will be a child of $T(S_2)$. Thus, par(S) must have been copied into the target tree before S can be copied. All profile metrics for the source node are added directly to the corresponding target node's fields. This includes the number of calls, the CUM time, and the BASE time. However, to get the copying process started, this requirement is waived for the root of the source tree; assume $T(par(S_{root}))$ is the root of the target tree. The profile metrics from the root node of the source tree are added to the root node of the target tree, and the root node of the source tree is marked as processed (step 2102).

Any node S from the source tree whose parent has already been copied to the target tree can be selected as the next node to be copied (step 2104). A determination is then made as to whether T(par(S)) already has a child node representing the same routine as S (step 2106). If not, a new child node is created in the target tree (step 2108), the routine name of the new node is set to the routine name of S (step 2110), and the profile metrics in the target node, such as the number of calls to the target node, is set to zero (step 2112). The profile metrics in S, such as the number of calls to S, are then added to the profile metrics stored in its corresponding node T(S) (whether newly created or pre-existing) in the target tree, and the source node is marked as processed (step 2114).

A determination is then made as to whether there are any remaining uncopied nodes in the source tree (step 2116). If so, then the process branches back to 2104 where another node is selected to be copied. If not, the process is complete. In this manner, each call stack tree segment is added to the resulting, or final, call stack tree.

With the profiling approach described above, each new periodic sample is treated as an independent tree segment. When the job is completed, each call stack tree segment in the forest of trees generated during the entire profiling job are merged. During the merging operation, profile metrics, such as base times, are updated as the sums of base times for the routines as appropriate. Almost no system perturbation or system performance degradation is caused outside of the sample periods when trace processing is not occurring.

It is possible that call stack tree segments may be merged together incorrectly since the error recovery procedure cannot guarantee accuracy in the formation of call stack tree segments that are almost certain to have errors in the representations of execution flows from unmatched or mismatched entry/exit events at the beginning of a sample period. In other words, identical call stack trees that were generated in different contexts may be combined. However, the total time spent within a given method is correct within the sampled context in which the time values were generated.

One aspect of why a call stack tree contains errors introduced from mismatched or unmatched entry/exit events is the fact that the call stack tree is empty at the beginning of the sample period. As the profiler receives events and adds nodes that represent the corresponding routines that have generated the events, the profiler necessarily builds a call stack tree that includes some structural errors caused by the receipt of exit events without their corresponding entry events. However, if the profiler were able to begin the sampling period with some guidance as to the correct placement of the newly generated nodes or some guidance concerning the handling of the entry and exit events with respect to the nodes that may already be present within the call stack tree, then the profiler would be able to build a call stack tree having a structure in which the introduction of errors from mismatched or unmatched events would be minimized.

Since these entry/exit event mismatches are expected to occur at the beginning of a sample period, an attempt can be made to anticipate these expected event mismatches. Using an appropriate method, one could prepare the state of the profiler for these event mismatches, although some consideration should be given to the manner in which this is accomplished.

One would like to preserve the benefits of sample-based profiling, which allows for configurable periods without system perturbation or system performance degradation caused by trace processing. In addition, one would like to avoid computationally expensive trace processing, i.e. the introduction of system perturbation or system performance degradation that could potentially be caused by preparing the state of the profiler at the beginning of the sample period.

Figure 22:
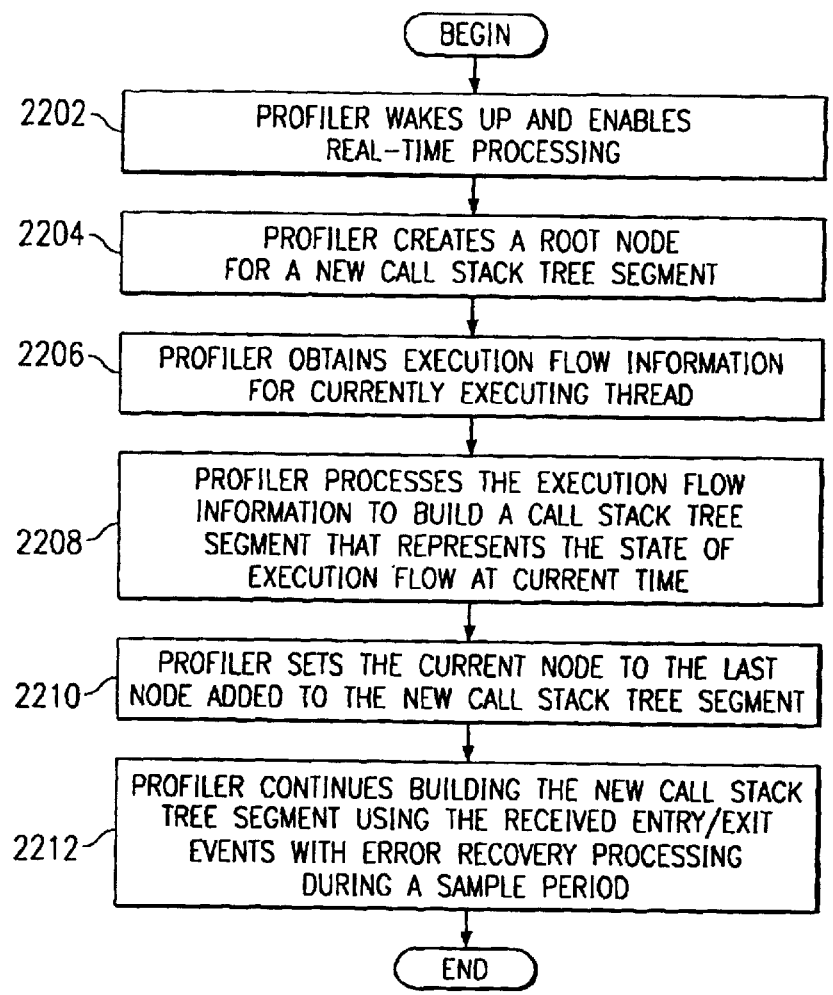
FIG. 22 is a flowchart depicting a process for generating a new call stack tree segment at the beginning of a sample period in accordance with a preferred embodiment of the present invention.

With reference now to FIG. 22, a flowchart depicts a process for generating a new call stack tree segment at the beginning of a sample period in accordance with a preferred embodiment of the present invention. The depicted process essentially describes the processing that may be included in the execution of the profiler between steps 2010 and 2012 in FIG. 20. The process begins when the profiler wakes up and enables real-time trace processing (step 2202) and then creates a root node for a new call stack tree segment (step 2204).

Immediately before the profiler made a determination to begin a sample period, preferably in response to a timer interrupt from the expiration of a timer measuring a period during which the profiler either does not perform trace processing or only performs some type of lightweight trace processing, the current thread was executing for some period of time. It is assumed that, while the current thread was processing, information related to its execution flow was stored in some manner. The profiler then obtains execution flow information for the currently executing thread (step 2206).

The profiler then processes the execution flow information to build a call stack tree segment that represents the state of execution flow at the current point in time (step 2208). The last node added to the new call stack tree segment represents the currently executing routine as indicated in the execution flow information, so the profiler sets the current node to the last node added to the new call stack tree segment (step 2210). The profiler may then continue to build the new call stack tree segment using the received entry/exit events with error recovery processing during the sample period (step 2212). The process is then complete with respect to the profiler building a new call stack tree segment and continuing trace processing during the sample period.

A variety of processes may be used to obtain the execution flow information and to build the call stack tree segment, as described below in more detail. Alternatively, multiple processes may be used together to obtain the execution flow information and to build the call stack tree segment.

Figure 23:
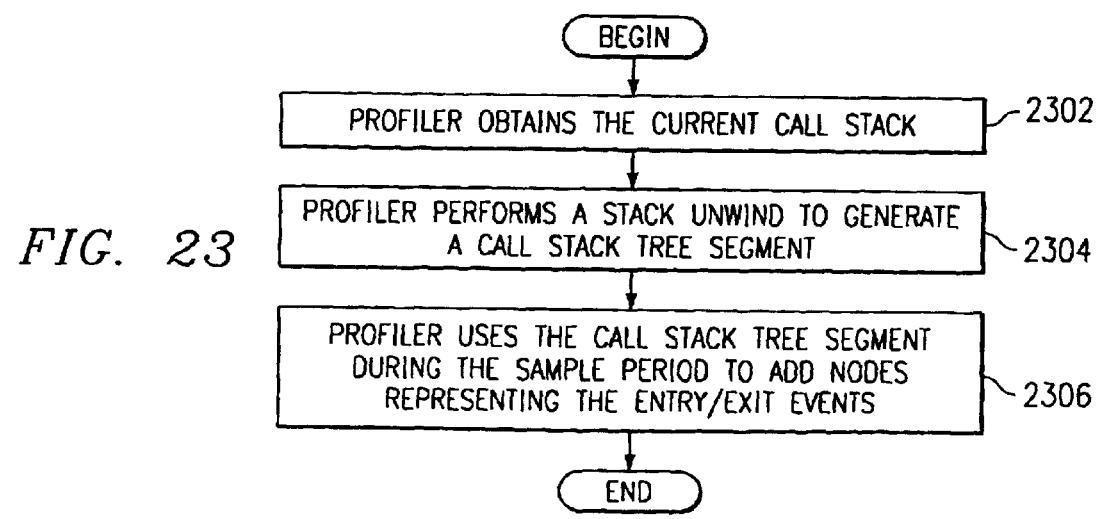
FIG. 23 is a flowchart depicting a process for performing a stack unwind to obtain execution flow information for a current thread and to build a call stack tree segment at the beginning of a sample period.

With reference now to FIG. 23, a flowchart depicts a process for performing a stack unwind to obtain execution flow information for a current thread and to build a call stack tree segment at the beginning of a sample period. The depicted process essentially describes the processing that may be included in the execution of the profiler in place of steps 2206 and 2208 in FIG. 22.

The process begins with the profiler obtaining the current call stack (step 2302), e.g., the Java stack for the current thread, and then performing a stack unwind to generate a call stack tree segment (step 2304). In other words, the current stack is processed on-the-fly, as was described above in more detail, i.e. the current stack is walked to determine the current sequence of routine calls, and a node is created in the call stack tree segment for each call found in the current stack.

The profiler then uses the call stack tree generated by walking the stack as the current call stack tree segment for the sample period (step 2306). The process is then complete with respect to the profiler determining a current call stack location to be used during the current sample period. The profiler may then continue the previously described event trace processing during the sample period to build call stack tree segments.

Although the stack unwind operation creates a certain amount of processing overhead at the start of each sample period, the burden of the processing overhead depends on the sampling rate. If the amount of time required to perform the stack unwind is comparable to the sampling period, then the extra overhead for the stack unwind would be significant, and the overall profiling process could be substantially degraded. However, if parameters for the profiling facility are selected through an interactive user interface, the user of the profile utility can be automatically alerted when choosing a sampling period that is too thin. If the amount of time required to perform the stack unwind is much smaller than the sampling period, then the extra overhead should be insignificant and substantially outweighed by the benefits received through the use of the stack unwind to determine a call stack location.

In this manner, an attempt is made to create a call stack tree segment that contains nodes in a correct structural configuration. When the new call stack tree segment is created, the nodes represent a partial, current, calling sequence between routines. Although the nodes do not contain execution-related metric information, such as the amount of time spent per routine, any nodes whose execution-related metric information remains empty after the sample period is complete will not affect the overall execution-related metrics tallied when the final call stack tree is generated during the post-processing phase after the execution of the profiled program is complete. In addition, as entry and exit events are received by the profiler during the sample period, the profiler should encounter fewer unmatched or mismatched events with this methodology.

At the end of a sample period, a call stack tree segment will contain nodes based on two kinds of input—stack unwinds and entry/exit events. The portions of the call stack tree segment based on entry/exit events will have profile metrics, whereas the portions of the call stack tree segment based on the stack unwind will not. At the time that the call stack tree segments are merged into the final call stack tree, the profile metrics of the call stack tree segments are added or merged into the profile metrics of the final call stack tree. The merge process was described above with respect to FIG. 21, except that with call stack tree segments created with this process, it is necessary to propagate the correct values for BASE times up the target tree, which is described below in more detail in FIG. 26.

Figure 24A:
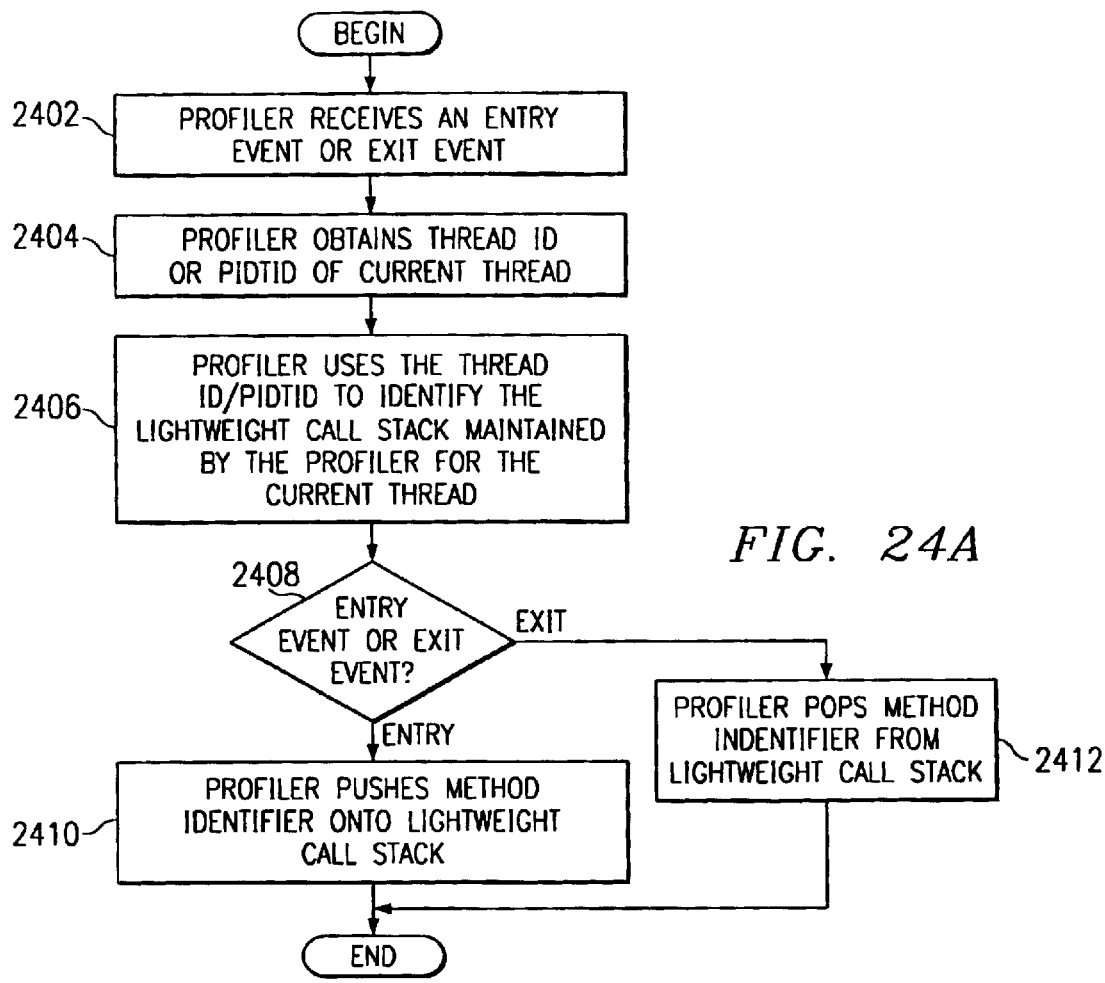
FIG. 24A is a flowchart depicting a lightweight process for maintaining a minimal call stack for a thread to gather execution flow information.

The aforementioned process for performing a stack unwind is one example of a process for obtaining execution flow information at the beginning of a sample period in order to determine a current call stack position. Another example is provided in the flowchart described with respect to FIGS. 24A–24B. FIG. 24A describes a process for maintaining execution flow information, and FIG. 24B describes a process for employing the execution flow information to properly determine a call stack location at the beginning of a sample period.

With reference now to FIG. 24A, a flowchart depicts a lightweight process for maintaining a minimal call stack for a thread to gather execution flow information. The depicted process essentially describes the processing that may be performed prior to step 2010 in FIG. 20, i.e. during step 2008 in which the profiler performs only lightweight processing, or that may be performed prior to step 2202 in FIG. 22, i.e. in the periods between the sample periods.

Although the process described with respect to FIG. 24A is performed between sample periods, the process is also performed during a sample period to ensure that the execution flow information, i.e. the lightweight call stack, is always up-to-date. Hence, the trace processing of the events occurs only during the sample periods, whereas the lightweight call stack processing occurs continuously throughout the profiling phase.

The process begins with the profiler receiving an entry event or exit event (step 2402). The current thread ID or pidtid is obtained (step 2404), and the lightweight call stack maintained by the profiler for the current thread is identified (step 2406).

A determination is then made as to whether the event is an entry event or an exit event (step 2408). If the event is an entry event, then the routine name, method name, or equivalent method identifier is pushed onto the lightweight call stack (step 2410). If the event is an exit event, then the routine name, method name, or equivalent method identifier is popped from the lightweight call stack (step 2412). The process is then complete with respect to the profiler performing lightweight processing for entry/exit events to gather execution flow information.

Figure 24B:
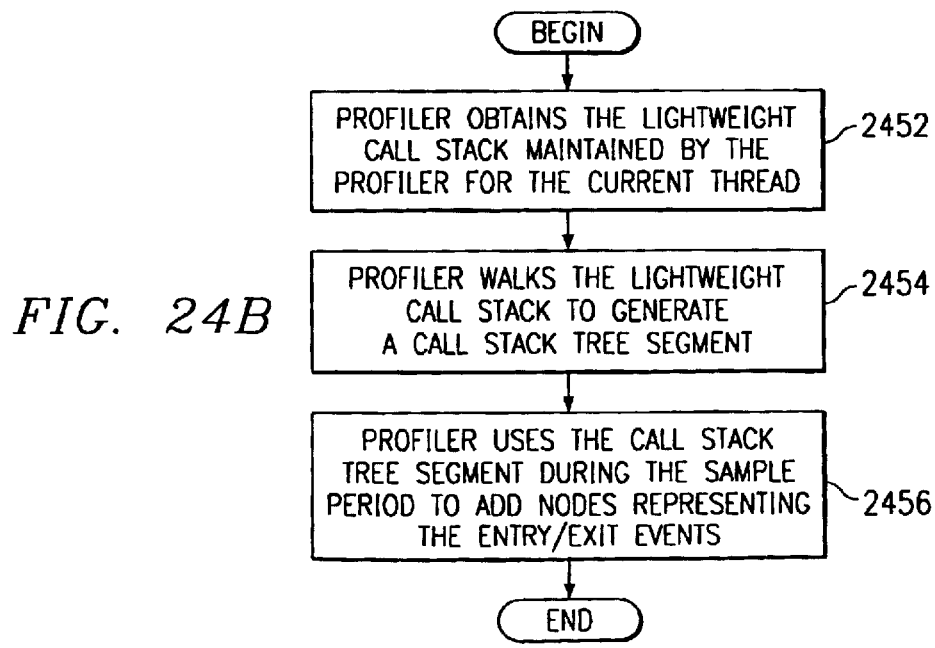
FIG. 24B is a flowchart depicting a process for walking a lightweight call stack maintained by the profiler to obtain execution flow information for a current thread and to build a call stack tree segment at the beginning of a sample period.

With reference now to FIG. 24B, a flowchart depicts a process for walking a lightweight call stack maintained by the profiler to obtain execution flow information for a current thread and to build a call stack tree segment at the beginning of a sample period. The depicted process essentially describes the processing that may be included in the execution of the profiler in place of steps 2206 and 2208 in FIG. 22.

The process begins with the profiler obtaining the current lightweight call stack maintained by the profiler for the current thread (step 2452). The profiler then walks the lightweight call stack to generate a call stack tree segment (step 2454). In other words, the current lightweight call stack is processed on-the-fly, as was described above in more detail, i.e. the current lightweight call stack is walked to determine the current sequence of routine calls, and a node is created in the call stack tree segment for each call found in the current lightweight call stack.

The profiler then uses the call stack tree generated by walking the current lightweight call stack as the current call stack tree segment for the current sample period (step 2456). The process is then complete with respect to the profiler determining a current call stack location to be used during the current sample period. The profiler may then continue the previously described event trace processing during the sample period to build call stack tree segments.

In this manner, as was the case with the stack unwind example described above, an attempt is made to create a call stack tree segment that contains nodes in a correct structural configuration. When the new call stack tree segment is created, the nodes represent a partial, current, calling sequence between routines. Although the nodes do not contain execution-related metric information, such as the amount of time spent per routine, any nodes whose execution-related metric information remains empty after the sample period is complete will not affect the overall execution-related metrics tallied when the final call stack tree is generated during the post-processing phase after the execution of the profiled program is complete. In addition, as entry and exit events are received by the profiler during the sample period, the profiler should encounter fewer unmatched or mismatched events with this methodology.

At the end of a sample period, a call stack tree segment will contain nodes based on two kinds of input—entry/exit events and the lightweight call stack. The portions of the call stack tree segment based on entry/exit events will have profile metrics, whereas the portions of the call stack tree segment based on the processing of the lightweight call stack will not. At the time that the call stack tree segments are merged into the final call stack tree, the profile metrics of the call stack tree segments are added or merged into the profile metrics of the final call stack tree. The merge process was described above with respect to FIG. 21, except that with call stack tree segments created with this process, it is necessary to propagate the correct values for BASE times up the target tree, which is described below in more detail in FIG. 26.

The amount of processing overhead incurred by the profiler for the lightweight call stack maintenance should be minimal as the profiler merely performs stack push and stack pop operations. The extra overhead should be insignificant and substantially outweighed by the benefits received through the use of the lightweight call stack unwind to determine a call stack location.

By using the process described above for maintaining and employing a lightweight call stack, the profiler gains the ability to provide additional functionality. Although the process described above with respect to FIG. 20 significantly reduces system perturbation and system performance degradation by profiling the executing program only during sample periods, the profiling activity may be narrowed further and specifically tailored to the needs of the user of the profile utility.

In order to allow the user to tailor the operation of the profile utility, the user may pass operating parameter values through a command line interface to the profiling utility to control the operation of the profiler. For example, a user may enter command-line arguments when invoking an application, and the values of the command-line arguments are passed to the main routine of the application, which then uses these parameters to select options that modify the behavior of the application.

The use of parameters to control a mode of operation of an application is well known in the art, and a variety of mechanisms exists to do so. In addition to the command line interface mentioned above, application input files are commonly used for passing values to an application. For example, the Java runtime environment allows the use of property files from which applications may read input parameters. Other system use resource files, environment variables, etc.

The lightweight call stack methodology allows the user of the profile utility to specifically tailor the operation of the profile utility by providing an execution point at which the profiler may efficiently filter the event processing.

Figure 25A:
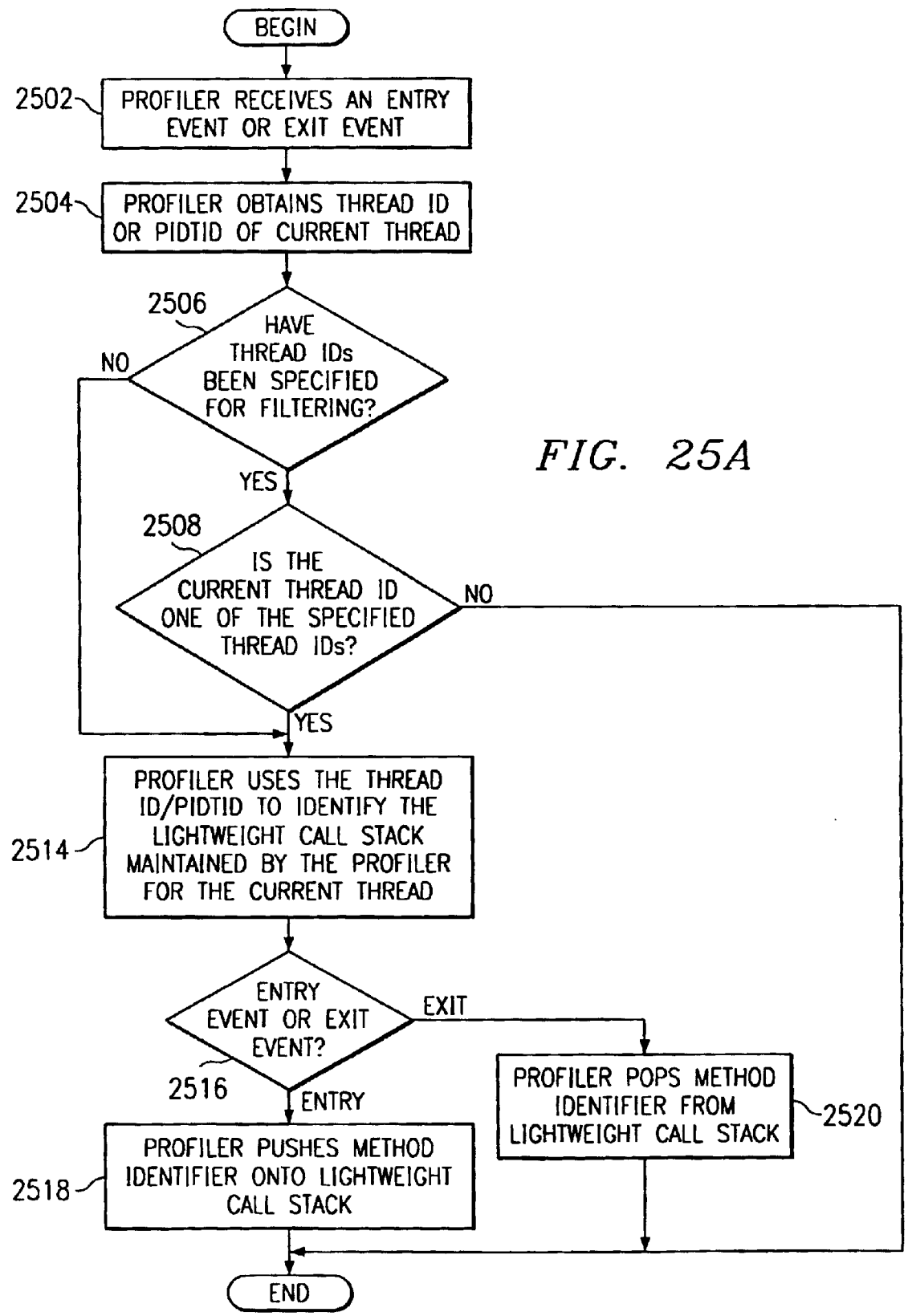
FIG. 25A is a flowchart depicting a process by which the profiler filters the events received during the profiling phase according to user-specified threads.

With reference now to FIG. 25A, a flowchart depicts a process by which the profiler filters the events received during the profiling phase according to user-specified threads. It is assumed that the user has had the opportunity to specify thread names or thread IDs for the profile utility through an appropriate manner, such as through a command line interface using a parameter specification similar to "threadname= . . . " or threadID= . . . ". Alternatively, some other type of user interface, such as a graphical user interface, may be used to accept user preferences and user parameters. The profiler stores these user-specified parameters for subsequent use for filtering events received by the profiler.

The process begins with the profiler receiving an entry event or exit event (step 2502). The current thread ID or pidtid is obtained (step 2504), and a determination is made as to whether the profiler has received user-specified thread identifiers/names for filtering (step 2506). If not, then the process continues. If so, then a determination is made as to whether the current thread is included in the list of one or more thread identifiers/names that were specified by the user (step 2508). If not, then the process is complete as the profiler is not maintaining a lightweight call stack for the current thread. If so, then the profiler continues the process at step 2514.

The lightweight call stack maintained by the profiler for the current thread is identified (step 2514). A determination is then made as to whether the event is an entry event or an exit event (step 2516). If the event is an entry event, then the routine name, method name, or equivalent method identifier is pushed onto the lightweight call stack (step 2518). If the event is an exit event, then the routine name, method name, or equivalent method identifier is popped from the lightweight call stack (step 2520). The process is then complete with respect to the profiler performing lightweight processing for entry/exit events to gather execution flow information according to user-specified filtering parameters.

During the sampling period, each time that the profiler receives an event, similar checks are made to determine whether the profiler is maintaining a lightweight call stack for the current thread. If not, the event is ignored. If so, then the event is processed into the current call stack tree segment. In this manner, the user is able to specify filtering parameters for the profiler using thread names/IDs as filter values. If a user specifies a particular thread through the user interface, then only events received during the execution of the specified threads would be processed, resulting in a type of thread filter.

As another processing alternative, only events received during the execution of the specified methods would be processed, resulting in a type of method filter, independent of the lightweight call stack processing. If a specified method is called, then events received during the execution of code within the method, i.e. during the base time of the method, could be processed, and in addition, all events received during the execution of the methods called by the specified method and their descendents, i.e. during the cumulative time of the method, could be processed. Once the specified method exited, then events would not be processed until another user-specified method were called. This would also apply to recursively called methods.

Figure 25B:
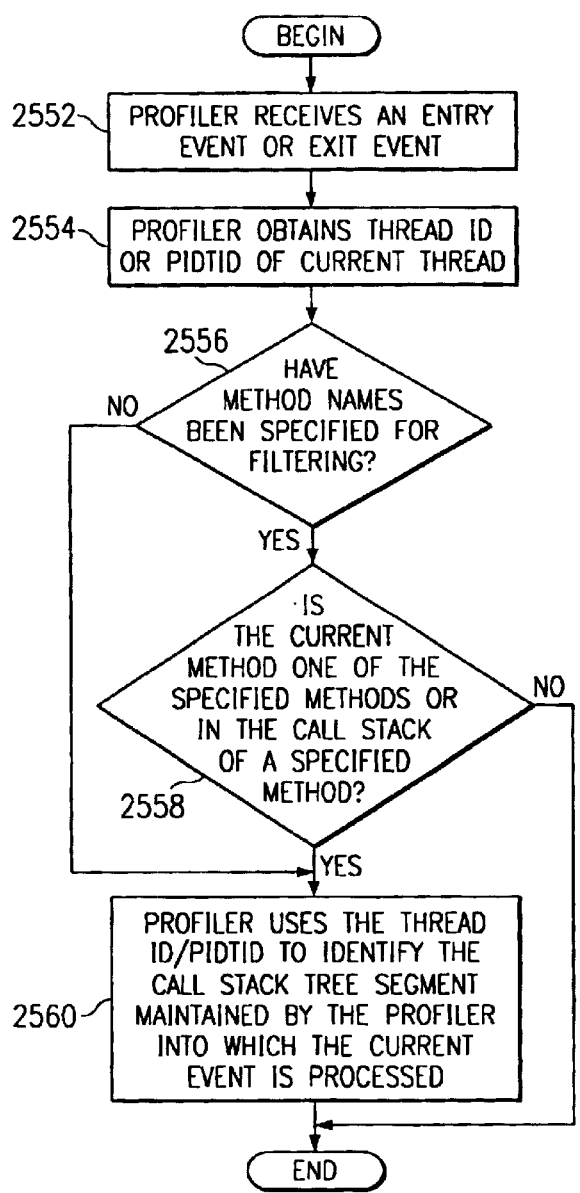
FIG. 25B is a flowchart depicting a process by which the profiler filters the events received during the profiling phase according to user-specified methods.

With reference now to FIG. 25B, a flowchart depicts a process by which the profiler filters the events received during the profiling phase according to user-specified methods. It is assumed that the user has had the opportunity to specify method names for the profile utility through an appropriate manner, such as through a command line interface using a parameter specification similar to "methodname= . . . ". Alternatively, some other type of user interface, such as a graphical user interface, may be used to accept user preferences and user parameters. The profiler stores these user-specified parameters for subsequent use for filtering events received by the profiler.

The process begins with the profiler receiving an entry event or exit event (step 2552). The current thread ID or pidtid is obtained (step 2554), and a determination is made as to whether the profiler has received user-specified method names for user-directed filtering (step 2556). If not, then the process continues at step 2560. If so, then a determination is made as to whether the current method is included in the list of one or more method names that were specified by the user or whether the current method is contained within the call stack of a specified method (step 2558). If not, then the process is complete as the profiler is not processing events for the current method. If so, then the profiler continues processing the event by using the current thread ID to obtain the call stack tree segment into which the current event is processed (step 2560). The process is then complete with respect to the profiler processing entry/exit events to gather execution flow information according to user-specified method filtering parameters.

Figure 26:
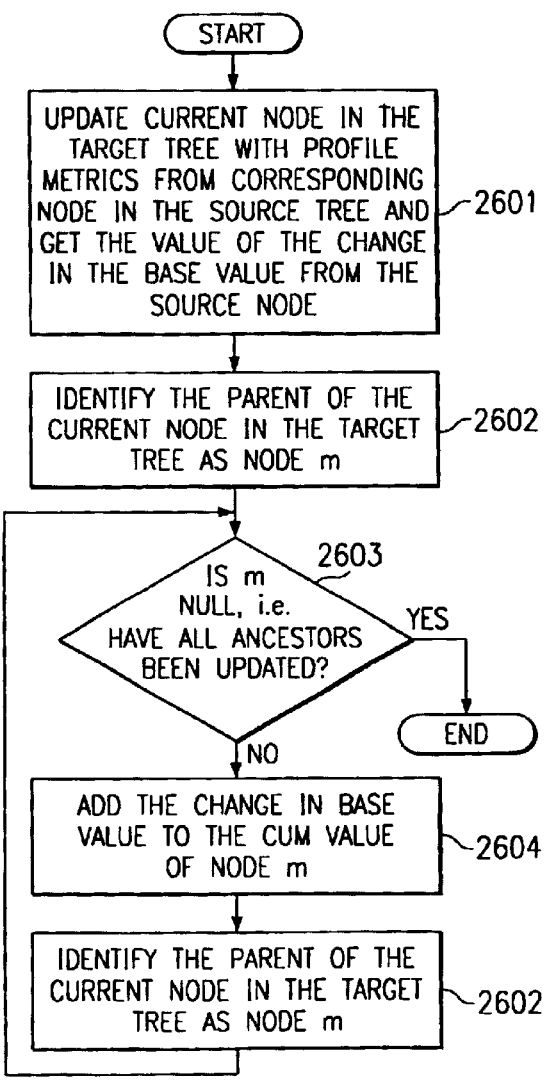
FIG. 26 is a flowchart depicting an extension of the process, shown in FIG. 21, of merging call stack tree segments that may have nodes without profile metrics, which would be generated using the processes shown in either FIG. 23 or FIGS. 24A–24B.

With reference now to FIG. 26, a flowchart depicts an extension of the process, shown in FIG. 21, of merging call stack tree segments that may have nodes without profile metrics, which would be generated using the processes shown in either FIG. 23 or FIGS. 24A–24B. As noted above in the description of FIG. 23 and FIGS. 24A–24B, the mixture of types of nodes found in the call stack tree segments requires the propagation of the correct values for BASE times up the target tree. Hence, FIG. 21 is extended with a subprocess described below.

Referring back to FIG. 21, step 2114, the CUM time statistics for all nodes in the target tree structure require updating after the addition of profile metrics to the corresponding target node. The update operation can be performed either incrementally, after each target node is processed, or it can be delayed until the end of processing of the entire target tree, or it could be delayed until all target trees have been processed. In many respects, it depends on the use of the data in the target tree. If it is desired that the target tree performance statistics be completely consistent following the processing of every source tree node, then the additional BASE time values must be propagated up the target tree from a corresponding target node to its parent and all the way up to the root. These values are reflected in, i.e. are added into, the CUM time of all parents. If it is only necessary that the target tree be consistent following the processing of an entire target tree, then the propagation step can be conducted at this time. If target tree consistency is only required at the end of all processing, then the propagation can be delayed until then.

The subprocess begins with the assumption that a node, e.g., node $T_n$, in the target tree has just been updated, which is equivalent to step 2114 shown in FIG. 21, and the incremental change in the BASE value, deltaBASE, for the current target node $T_n$ is identified as the BASE value in source node $S_n$ (step 2601).

Each node in the ancestor chain for node Tn then has its CUM value updated by the value deltaBASE in the following manner. The parent of the current node is identified, node m=par($T_n$) (step 2602). A determination is made as to whether node m is null, i.e. whether all ancestors of node m have been updated (step 2603). If so, then the subprocess is complete. If not, then the value deltaBASE is added to the CUM value for node m (step 2604). The next parent of node m is then identified (step 2605), and the process loops back to step 2603). In this manner, the CUM value may be propagated up the tree.

The advantages of the present invention should be apparent with reference to the detailed description provided above. With the profiling approach described above, each new periodic sample is treated as an independent tree segment. When the job is completed, each call stack tree segment in the forest of trees generated during the entire profiling job are merged. During the merging operation, profile metrics, such as base times, are updated as the sums of base times for the routines as appropriate. Almost no system perturbation or system performance degradation is caused outside of the sample periods when trace processing is not occurring.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for profiling a program executing in the data processing system, the method comprising:

performing sample-based profiling of the executing program;

creating, at a start of each sample period, a tree data structure containing nodes, in which the nodes of the tree data structure represent routines of the program that execute before a sample period; and generating, for each sample period, nodes for the tree data structure in which the nodes of the tree data structure represent routines of the program that execute during a sample period, wherein the creating produces a result that includes a plurality of tree data structures.

2. The method of claim 1 further comprising:

recording execution-related metrics for a sample period in the nodes of the tree data structure.

3. The method of claim 1 further comprising:

obtaining execution flow information at the start of each sample period;

processing the execution flow information to create a new tree data structure to be used during the sample period.

4. The method of claim 3 further comprising:

performing a stack unwind operation to obtain the execution flow information.

5. The method of claim 4 wherein the stack unwind operation is performed on the system call stack.

6. The method of claim 5 wherein the stack unwind operation is performed on a lightweight call stack maintained for the profiling functions.

7. The method of claim 1 further comprising:

enabling event-based trace processing for user-specified threads.

8. The method of claim 1 further comprising:

enabling event-based trace processing for user-specified methods.

9. The method of claim 1 further comprising:

constructing the tree data structures in real-time as trace data is generated during execution of the program.

10. The method of claim 1 further comprising:

in response to a determination of completion of the execution of the program, merging the plurality of tree data structures into a resulting tree data structure.

11. The method of claim 10 wherein the step of merging tree data structures further comprises:

generating a root node for an empty tree data structure representing a final tree data structure;

for each tree data structure in the plurality of tree data structures, adding a tree data structure for a sample period to the final tree data structure to create a union of the tree data structure for a sample period and the final tree data structure.

12. A data processing system for profiling a program executing in the data processing system, the data processing system comprising:

performing means for performing sample-based profiling of the executing program;

creating means for creating, at a start of each sample period, a tree data structure containing nodes, in which the nodes of the tree data structure represent routines of the program that execute before a sample period; and first generating means for generating, for each sample period, nodes for the tree data structure in which the nodes of the tree data structure represent routines of the program that execute during a sample period, wherein the creating produces a result that includes a plurality of tree data structures.

13. The data processing system of claim 12 further comprising:

recording means for recording execution-related metrics for a sample period in the nodes of the tree data structure.

14. The method of claim 12 further comprising:

obtaining means for obtaining execution flow information at the start of each sample period; and processing means for processing the execution flow information to create a new tree data structure to be used during the sample period.

15. The data processing system of claim 14 further comprising:

performing means for performing a stack unwind operation to obtain the execution flow information.

16. The data processing system of claim 15 wherein the stack unwind operation is performed on the system call stack.

17. The data processing system of claim 16 wherein the stack unwind operation is performed on a lightweight call stack maintained for the profiling functions.

18. The data processing system of claim 12 further comprising:

first enabling means for enabling event-based trace processing for user-specified threads.

19. The data processing system of claim 12 further comprising:

second enabling means for enabling event-based trace processing for user-specified methods.

20. The data processing system of claim 12 further comprising:

constructing means for constructing the tree data structures in real-time as trace data is generated during execution of the program.

21. The data processing system of claim 12 further comprising:

merging means for merging, in response to a determination of completion of the execution of the program, the plurality of tree data structures into a resulting tree data structure.

22. The data processing system of claim 21 wherein the merging means for merging tree data structures further comprises:

second generating means for generating a root node for an empty tree data structure representing a final tree data structure; and adding means for adding, for each tree data structure in the plurality of tree data structures, a tree data structure for a sample period to the final tree data structure to create a union of the tree data structure for a sample period and the final tree data structure.

23. A computer program product in a computer-readable medium for use in a data processing system for profiling an executing program, the computer program product comprising:

first instructions for performing sample-based profiling of the executing program;

second instructions for creating, at a start of each sample period, a tree data structure containing nodes, in which the nodes of the tree data structure represent routines of the program that execute before a sample period; and third instructions for generating, for each sample period, nodes for the tree data structure in which the nodes of the tree data structure represent routines of the program that execute during a sample period, wherein the creating produces a result that includes a plurality of tree data structures.

24. The computer program product of claim 23 further comprising:

instructions for recording execution-related metrics for a sample period in the nodes of the tree data structure.

25. The computer program product of claim 23 further comprising:

instructions for obtaining execution flow information at the start of each sample period; and instructions for processing the execution flow information to create a new tree data structure to be used during the sample period.

26. The computer program product of claim 25 further comprising:

instructions for performing a stack unwind operation to obtain the execution flow information.

27. The computer program product of claim 26 wherein the stack unwind operation is performed on the system call stack.

28. The computer program product of claim 27 wherein the stack unwind operation is performed on a lightweight call stack maintained for the profiling functions.

29. The computer program product of claim 23 further comprising:

instructions for merging, in response to a determination of completion of the execution of the program, the plurality of tree data structures into a resulting tree data structure.

30. The computer program product of claim 29 wherein the instructions for merging tree data structures further comprises:

instructions for generating a root node for an empty tree data structure representing a final tree data structure;

instructions for adding, for each tree data structure in the plurality of tree data structures, a tree data structure for a sample period to the final tree data structure to create a union of the tree data structure for a sample period and the final tree data structure.

* * * * *

UNITED STATES PATENT AND TRADEMARK OFFICE
CERTIFICATE OF CORRECTION

PATENT NO.    : 6,751,789 B1
DATED         : June 15, 2004
INVENTOR(S)   : Berry et al.

It is certified that error appears in the above-identified patent and that said Letters Patent is hereby corrected as shown below:

Column 35,
Line 14, after "The" delete "method" and insert -- data processing system --.

Signed and Sealed this

Second Day of August, 2005

JON W. DUDAS
*Director of the United States Patent and Trademark Office*